US008083811B2

(12) United States Patent  (10) Patent No.: US 8,083,811 B2
Roentgen et al.  (45) Date of Patent: Dec. 27, 2011

(54) MIXTURES OF REACTIVE DYES AND THEIR USE IN A METHOD FOR TRICHROMATIC DYEING OR PRINTING

(75) Inventors: Georg Roentgen, Freiburg (DE); Athanassios Tzikas, Pratteln (CH); Hubert Jean Luc Christnacher, Dietwiller (FR)

(73) Assignee: Huntsman International LLC, The Woodlands, TX (US)

( * ) Notice: Subject to any disclaimer, the term of this patent is extended or adjusted under 35 U.S.C. 154(b) by 59 days.

(21) Appl. No.: 12/513,464
(22) PCT Filed: Oct. 30, 2007
(86) PCT No.: PCT/EP2007/061642
§ 371 (c)(1),
(2), (4) Date: May 4, 2009
(87) PCT Pub. No.: WO2008/055805
PCT Pub. Date: May 15, 2008

(65) Prior Publication Data
US 2010/0077555 A1  Apr. 1, 2010

(30) Foreign Application Priority Data
Nov. 9, 2006  (EP) ..................... 06123761

(51) Int. Cl.
*C09B 45/42* (2006.01)
*C09B 62/09* (2006.01)
*C09B 62/095* (2006.01)
(52) U.S. Cl. ............ 8/685; 8/636; 8/639; 8/641; 8/662; 8/666; 8/667; 8/669; 8/670; 8/680; 8/682; 8/686; 8/687; 8/688; 8/690
(58) Field of Classification Search .............. 8/636, 639, 8/641, 662, 666, 667, 669, 670, 680, 681, 8/682, 685, 686, 687, 688, 690
See application file for complete search history.

(56) References Cited

U.S. PATENT DOCUMENTS

| 4,378,313 | A | * | 3/1983 | Kayane et al. | 534/638 |
| 4,663,440 | A | * | 5/1987 | Omura et al. | 534/637 |
| 4,698,421 | A | | 10/1987 | Kayane et al. | |
| 4,772,687 | A | * | 9/1988 | Henk | 534/624 |
| 4,798,887 | A | | 1/1989 | Krueger et al. | |
| 5,079,347 | A | | 1/1992 | Buch | |
| 5,110,356 | A | | 5/1992 | Shirota et al. | |
| 5,486,600 | A | | 1/1996 | Deitz et al. | |
| 6,623,533 | B2 | | 9/2003 | Tzikas et al. | |
| 6,852,135 | B2 | | 2/2005 | Steckelberg et al. | |

FOREIGN PATENT DOCUMENTS

| CH | 496781 | 9/1970 |
| DE | 10035805 | 2/2002 |
| EP | 0021105 | 1/1981 |
| EP | 0042108 | 12/1981 |
| EP | 0056975 | 8/1982 |
| EP | 0167858 | 1/1986 |
| EP | 0201026 | 11/1986 |
| EP | 0202570 | 11/1986 |
| EP | 0319845 | 6/1989 |
| EP | 0381228 | 8/1990 |
| EP | 0458743 | 11/1991 |
| EP | 0581733 | 2/1994 |
| FR | 1334025 | 8/1963 |
| WO | 02/04741 | 1/2002 |
| WO | 02/08342 | 1/2002 |

OTHER PUBLICATIONS

*Diazo Acid Dyes with 3-Amino-4-Methoxy Acetanilide and 1-Naphthylamine Components*, N. Sekar, et al., Colourage, vol. 52, No. 2, 2005, pp. 119-132.

* cited by examiner

*Primary Examiner* — Amina Khan

(57) ABSTRACT

Dye mixtures, comprising at least one dye of formula (1)

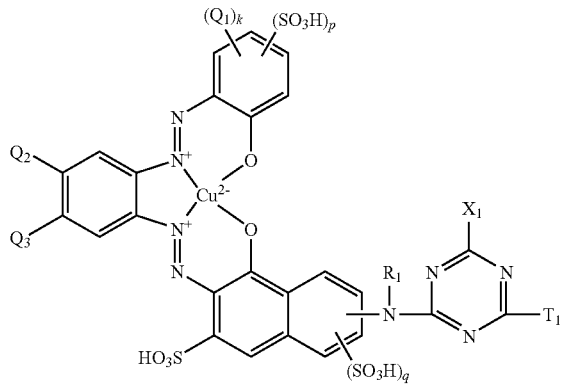

and at least one dye from the group of formulae (2)

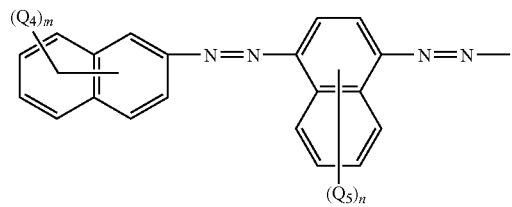

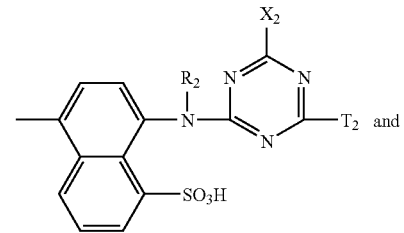

$T_2$ and (3)

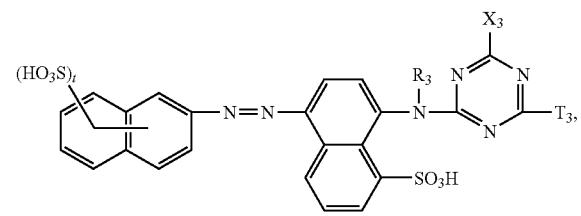

wherein the substituents are defined in the specification.

8 Claims, No Drawings

MIXTURES OF REACTIVE DYES AND THEIR USE IN A METHOD FOR TRICHROMATIC DYEING OR PRINTING

CROSS REFERENCE TO RELATED APPLICATIONS

This application is the National Phase of International Application PCT/EP2007/061642 filed Oct. 30, 2007 which designated the U.S. and which claims priority to European Patent Application (EP) 06123761.6 tiled Nov. 9, 2006. The noted applications are incorporated herein by reference.

The present invention relates to mixtures of reactive dyes that are suitable for the dyeing or printing of nitrogen-containing or hydroxy-group-containing fibre materials and yield on such materials dyeings or prints having good reproducibility and good all-round fastness properties. The present invention relates also to a method for dichromatic or trichromatic dyeing or printing wherein the reactive dye mixtures according to the invention are used.

Over the past few years, the taste in fashion has moved towards more restrained colours. The trend is for muted, autumnal colours with, for example, a large amount of brown, grey, olive, beige, khaki, sandy shades, dull yellow shades and aubergine. As a result, about 30 to 40% of the dyed or printed textiles currently produced are in muted colour shades.

Muted colour shades on cellulose are usually produced using vat dyes. Vat-dyed textile materials have good fastness properties, for example wet-fastness properties, but dyeing with vat dyes is expensive in terms of equipment. Vat dyeing is carried out in so-called continuous dyeing machines which are not universally available. Furthermore, dyeing on continuous machines is economical only for high meterages.

Dyed or printed textile materials having good wet-fastness properties can be obtained, for example, using reactive dyes that are covalently bonded to the textile fibre. Dyeing with reactive dyes can be carried out in accordance with, for example, the exhaust method or the pad-dyeing method. Those methods are less expensive in terms of equipment than dyeing on a continuous machine, and suitable apparatus is usually available in the dyeing works. Moreover, relatively low meterages can still be dyed economically in that way.

A disadvantage in the production of dyed or printed textiles in muted colour shades, however, is their poor reproducibility using the trichromatic principle in which the shade is obtained using mixtures of yellow- or orange-dyeing reactive dyes together with red- and blue-dyeing reactive dyes.

The present invention is therefore based on the problem of providing new mixtures of reactive dyes that are suitable especially for the reproducible, dichromatic and trichromatic dyeing and printing of fibre materials in muted colour shades. The dye mixtures according to the invention should also yield dyeings or prints having good all-round fastness properties, for example light fastness and wet fastness.

The present invention accordingly relates to dye mixtures comprising at least one dye, for example one, two or three dyes, preferably one dye of formula

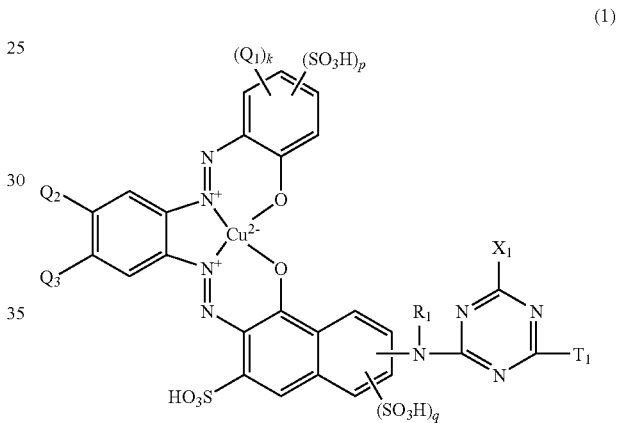

(1)

and at least one dye, for example one, two or three dyes, from the group of formulae

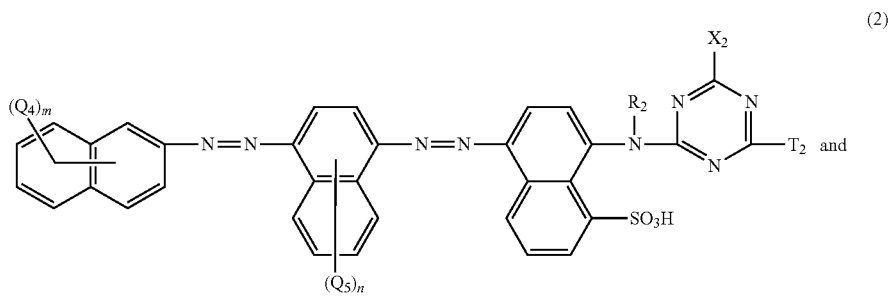

(2)

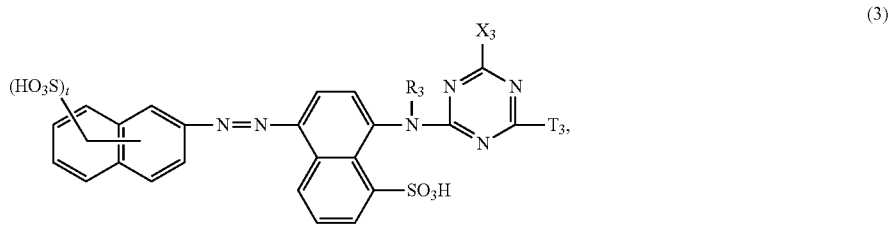

(3)

wherein $Q_1$ is $C_1$-$C_4$alkyl, halogen or a radical —$SO_2$—Z, $Q_2$ and $Q_3$ are each independently of the other $C_1$-$C_4$alkoxy, $Q_4$ is $C_1$-$C_4$alkoxy, $C_1$-$C_4$alkyl, halogen or sulfo, $Q_5$ is $C_1$-$C_4$alkoxy, $C_1$-$C_4$alkyl, $C_1$-$C_4$alkanoylamino, ureido, halogen or sulfa, $R_1$, $R_2$ and $R_3$ are each independently of the others hydrogen or unsubstituted or substituted $C_1$-$C_4$alkyl, k and q are each independently of the other the number 0 or 1, n and p are each independently of the other the number 0, 1 or 2, m is the number 0, 1, 2 or 3, t is the number 1, 2 or 3, $X_1$, $X_2$ and $X_3$ are each independently of the others halogen, 3-carboxypyridin-1-yl, 3-carbamoylpyridin-1-yl, or a non-fibre-reactive substituent, and $T_1$, $T_2$ and $T_3$ are each independently of the others a non-fibre-reactive substituent or a fibre-reactive radical of formula

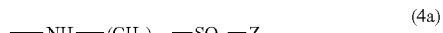  (4a)

  (4b)

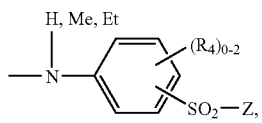  (4c)

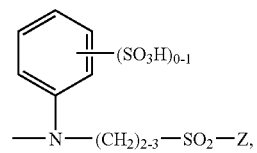  (4d)

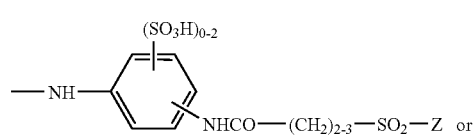  (4e)

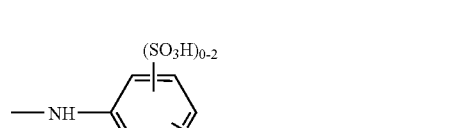  (4f)

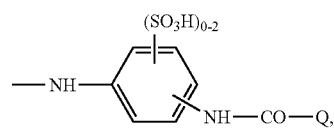  (4g)

wherein $(R_4)_{0-2}$ denotes from 0 to 2 identical or different substituents from the group halogen, $C_1$-$C_4$alkyl, $C_3$-$C_4$alkoxy and sulfo, Z is vinyl or a radical —$CH_2$—$CH_2$—U and U is a group removable under alkaline conditions, Q is a group —CH(Hal)-$CH_2$-Hal or —C(Hal)=$CH_2$, and Hal is halogen.

The dyes of formulae (1), (2) and (3) are fiber reactive, i.e. the dyes of formulae (1), (2) and (3) contain at least one fibre-reactive substituent.

Preferably, the dye mixtures according to the invention comprise at least one dye of formula (1), at least one dye of formula (2) and at least one dye of formula (3).

In the radical of formula (4c), Me is the methyl radical and Et is the ethyl radical. The said radicals come into consideration, in addition to hydrogen, as substituents at the nitrogen atom.

The terminal diazo component and the middle coupling component in the dye of formula (2) are each independently of the other either a benzene radical or a naphthalene radical, which is indicated by the broken lines. When the terminal diazo component is a naphthalene radical, the middle coupling component is preferably a benzene radical. When the terminal diazo component is a benzene radical, the middle coupling component is preferably a naphthalene radical.

The diazo component in the dye of formula (3) is either a benzene radical or a naphthalene radical, which is indicated by the broken lines. The diazo component is preferably a naphthalene radical.

As $C_1$-$C_4$alkyl there come into consideration for $Q_1$, $Q_4$, $Q_5$ and $R_4$ each independently of the others e.g. methyl, ethyl, propyl, isopropyl, n-butyl, sec-butyl, tert-butyl and isobutyl, preferably methyl and ethyl and especially methyl.

The alkyl radicals $R_1$, $R_2$ and $R_3$ are straight-chain or branched. The alkyl radicals may themselves be substituted, for example by hydroxy, sulfo, sulfato, cyano or by carboxy. Examples that may be mentioned are methyl, ethyl, n-propyl, isopropyl, n-butyl, sec-butyl, tert-butyl and isobutyl as well as the corresponding radicals substituted by hydroxy, sulfo, sulfato, cyano or by carboxy. Preferred as substituents are hydroxy, sulfa and sulfato, especially hydroxy and sulfato and more especially hydroxy.

As $C_1$-$C_4$alkoxy there come into consideration for $Q_2$, $Q_3$, $Q_4$, $Q_5$ and $R_4$ each independently of the others e.g. methoxy, ethoxy, n-propoxy, isopropoxy, n-butoxy and isobutoxy, preferably methoxy and ethoxy and especially methoxy.

As halogen there come into consideration for $Q_1$, $Q_4$, $Q_5$ and $R_4$ each independently of the others e.g. fluorine, chlorine and bromine, preferably chlorine.

As $C_1$-$C_4$alkanoylamino there comes into consideration for $Q_5$ e.g. acetylamino, propionyl-amino or butyrylamino, preferably acetylamino.

Preferably, $Q_1$ is methyl, chlorine or a radical —$SO_2$—Z, especially a radical —$SO_2$—Z wherein Z is as defined above.

Preferably, $Q_2$ and $Q_3$ are methoxy.

Preferably, $Q_4$ is $C_1$-$C_4$alkoxy, $C_1$-$C_4$alkyl or sulfa, especially sulfa.

Preferably, $Q_5$ is $C_1$-$C_4$alkoxy, $C_1$-$C_4$alkyl, $C_1$-$C_4$alkanoylamino or sulfa. When the middle coupling component is a naphthalene radical, $Q_5$ is especially sulfa.

When the middle coupling component is a benzene radical, $Q_5$ is especially $C_1$-$C_4$alkoxy, $C_1$-$C_4$alkyl or $C_1$-$C_4$alkanoylamino.

Preferably, $R_1$, $R_2$ and $R_3$ are each independently of the others hydrogen or $C_1$-$C_4$alkyl, especially hydrogen.

Preferably, $(R_4)_{0-2}$ denotes from 0 to 2 identical or different substituents from the group $C_1$-$C_4$alkyl, $C_1$-$C_4$alkoxy and sulfa, especially methyl, methoxy and sulfa.

More especially, $R_4$ is hydrogen.

As a non-fibre-reactive substituent $X_1$, $X_2$ and $X_3$ each independently of the others there come into consideration, for example, the definition given below for $T_1$, $T_2$ and $T_3$ as a non-fibre-reactive substituent, the preferred meanings given under $T_1$, $T_2$ and $T_3$ applying.

Preferably, $X_1$, $X_2$ and $X_3$ are halogen, 3-carboxypyridin-1-yl or 3-carbamoylpyridin-1-yl and, especially, $X_1$, $X_2$ and $X_3$ are halogen.

As halogen there come into consideration for $X_1$, $X_2$ and $X_3$ each independently of the others e.g. fluorine, chlorine and bromine, preferably fluorine and chlorine and especially chlorine.

When $T_1$, $T_2$ and $T_3$ are each independently of the others a non-fibre-reactive substituent, that substituent may be, for example, hydroxy; $C_1$-$C_4$alkoxy; $C_1$-$C_4$alkylthio unsubstituted or substituted e.g. by hydroxy, carboxy or by sulfo; amino; amino mono- or di-substituted by $C_1$-$C_8$alkyl, wherein alkyl is unsubstituted or is itself substituted e.g. by sulfo, sulfato, hydroxy, carboxy or by phenyl, especially by sulfo or by hydroxy, and may be interrupted one or more times by the radical —O—; cyclohexylamino; morpholino; N—$C_1$-$C_4$alkyl-N-phenylamino or phenylamino or naphthylamino, wherein the phenyl or naphthyl are unsubstituted or substituted e.g. by $C_1$-$C_4$alkyl, $C_1$-$C_4$alkanoylamino, carboxy, sulfo or by halogen and the alkyl is unsubstituted or substituted e.g. by hydroxy, sulfo or by sulfato.

Examples of suitable non-fibre-reactive substituents $T_1$, $T_2$ and $T_3$ are amino, methylamino, ethylamino, β-hydroxyethylamino, N-methyl-N-β-hydroxyethylamino, N-ethyl-N-β-hydroxy-ethylamino, N,N-di-β-hydroxyethylamino, β-sulfoethylamino, cyclohexylamino, morpholino, 2-, 3- or 4-chlorophenylamino, 2-, 3- or 4-methylphenylamino, 2-, 3- or 4-methoxyphenyl-amino, 2-, 3- or 4-sulfophenylamino, 2,5-disulfophenylamino, 2-, 3- or 4-carboxyphenyl-amino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxy.

As non-fibre-reactive substituents, $T_1$, $T_2$ and $T_3$ are each independently of the others preferably $C_1$-$C_4$alkoxy; $C_1$-$C_4$alkylthio unsubstituted or substituted by hydroxy, carboxy or by sulfo; hydroxy; amino; N-mono- or N,N-di-$C_1$-$C_4$alkylamino unsubstituted or substituted in the alkyl moiety by hydroxy, sulfato or by sulfo; morpholino; phenylamino unsubstituted or substituted on the phenyl ring by sulfa, carboxy, acetylamino, chlorine, methyl or by methoxy or N—$C_1$-$C_4$-alkyl-N-phenylamino unsubstituted or substituted in the same way wherein the alkyl is unsubstituted or substituted by hydroxy, sulfo or by sulfato; or naphthylamino unsubstituted or substituted by from 1 to 3 sulfo groups.

Especially preferred non-fibre-reactive substituents $T_1$, $T_2$ and $T_3$ are each independently of the others amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, β-sulfo-ethylamino, morpholino, 2-, 3- or 4-carboxyphenylamino, 2-, 3- or 4-sulfophenylamino, 2,5-disulfophenylamino or 4,8-disulfo-2-naphthylamino, especially 2-, 3- or 4-sulfophenylamino, 2,5-disulfophenylamino or 4,8-disulfo-2-naphthylamino.

Hal in the fibre-reactive radical of formula (4g) is preferably chlorine or bromine, especially bromine.

As leaving group U there comes into consideration, for example, —Cl, —Br, —F, —OSO$_3$H, —SSO$_3$H, —OCO—CH$_3$, —OPO$_3$H$_2$, —OCD—C$_6$H$_5$, —OSO$_2$—C$_1$-C$_4$alkyl or —OSO$_2$—C$_1$-C$_4$alkyl)$_2$. U is preferably a group of the formula —Cl, —OSO$_3$H, —SSO$_3$H, —OCO—CH$_3$, —OCO—C$_6$H$_5$ or —OPO$_3$H$_2$, especially —Cl or —OSO$_3$H.

Examples of suitable radicals Z are accordingly vinyl, β-bromo- or β-chloro-ethyl, β-acetoxy-ethyl, β-benzoyloxyethyl, β-phosphatoethyl, β-sulfatoethyl and β-thiosulfatoethyl. Z is preferably vinyl, β-chloroethyl or β-sulfatoethyl and especially β-sulfatoethyl or vinyl.

When $T_1$, $T_2$ and $T_3$ are each a fibre-reactive radical, $T_1$, $T_2$ and $T_3$ are each independently of the others preferably a radical of formula (4c), (4d), (4e) or (4f), especially of formula (4c) or (4e) and more especially of formula (4c).

k is preferably the number 0.

When the terminal diazo component in the dye of formula (2) is a benzene radical, m is preferably the number 0, 1 or 2, especially the number 1 or 2. When the terminal diazo component in the dye of formula (2) is a naphthalene radical, m is preferably the number 1, 2 or 3, especially the number 2 or 3.

When the middle coupling component in the dye of formula (2) is a benzene radical, n is preferably the number 1 or 2, especially the number 2. When the middle coupling component in the dye of formula (2) is a naphthalene radical, n is preferably the number 1.

Preferably, p is the number 1 or 2, especially the number 1.
Preferably, q is the number 0.
Preferably, t is the number 2 or 3, especially the number 2.
The radical of formula (4c) is preferably a radical of formula

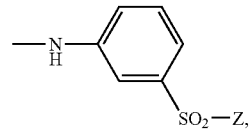
(4c')

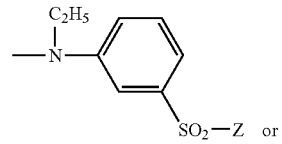
(4c")

(4c'")

especially preferably (4c') or (4c"), wherein Z has the definitions and preferred meanings given above.

Preference is given to dye mixtures wherein the dye of formula (1) corresponds to a dye of formula (1a)

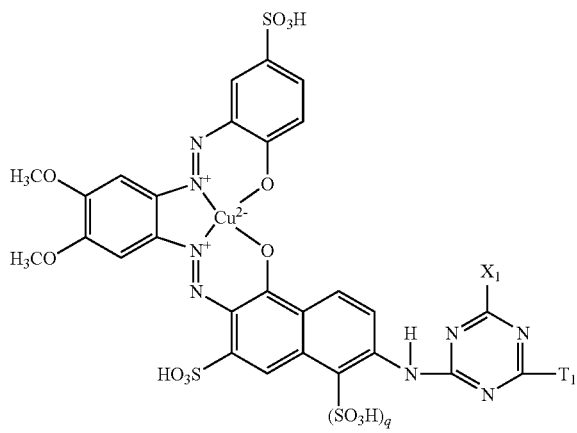

wherein $X_1$, $T_1$ and q each have the meanings and preferred meanings defined above, and especially, $X_1$ is fluorine or chlorine, q is the number 0 or 1, and $T_1$ is amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, β-sulfoethylamino, morpholino, 2-, 3- or 4-carbophenylamino, 2-, 3- or 4-sulfophenylamino, 2,5-disulfophenylamino, 4,8-disulfo-2-naphthylamino or a fibre-reactive radical of the above-mentioned formula (4c).

Preference is also given to dye mixtures wherein the dye of formula (2) corresponds to a dye of formula (2a)

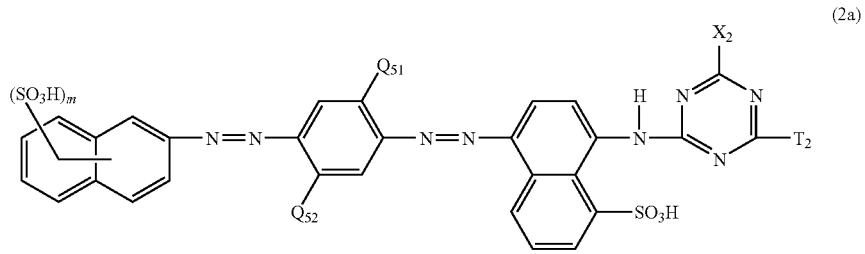

wherein
$X_2$ and $T_2$ each have the meanings and preferred meanings defined above, and
m is the number 1, 2 or 3,
$Q_{51}$ is $C_1$-$C_4$alkoxy, $C_1$-$C_4$alkyl, halogen or sulfo, and
$Q_{52}$ is $C_1$-$C_4$alkoxy, $C_1$-$C_4$alkanoylamino or ureido; and especially, $X_2$ is fluorine or chlorine, m is the number 2 or 3, $Q_{51}$ is $C_1$-$C_4$alkoxy or $C_1$-$C_4$alkyl, especially methoxy or methyl, $Q_{52}$ is $C_1$-$C_1$alkoxy, $C_1$-Colkyl or $C_1$-$C_4$alkanoylamino, especially methoxy, methyl or acetylamino, and $T_2$ is a fibre-reactive radical of the above-mentioned formula (4c).

In an interesting embodiment of the dye mixtures according to the invention, the dye of formula (2) is a dye of formula (2b)

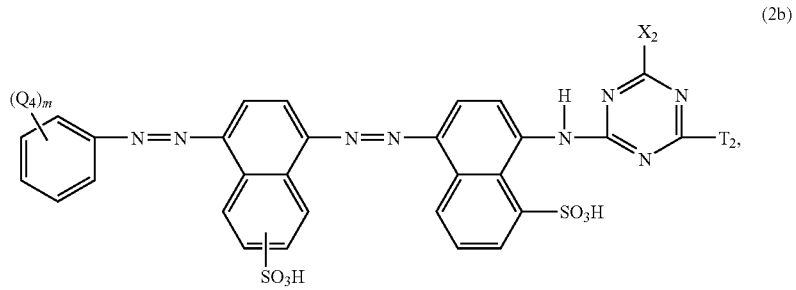

wherein
$X_2$, $Q_4$, $T_2$ and m each have the meanings and preferred meanings defined above, and especially, $X_2$ is fluorine or chlorine, m is the number 1 or 2, $Q_4$ is $C_1$-$C_4$alkoxy, $C_1$-$C_4$alkyl or sulfo, especially methyl, methoxy or sulfo, and $T_2$ is a fibre-reactive radical of the above-mentioned formula (4c).

Also preferred are dye mixtures wherein the dye of formula (3) corresponds to a dye of formula (3a)
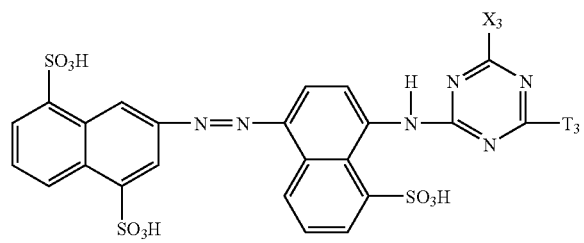
wherein
$X_3$ and $T_3$ each have the meanings and preferred meanings defined above, and especially, $X_3$ is fluorine or chlorine, and $T_3$ is a fibre-reactive radical of the above-mentioned formula (4c).
The dye of formula (1) is, for example, a dye of formula
(101)
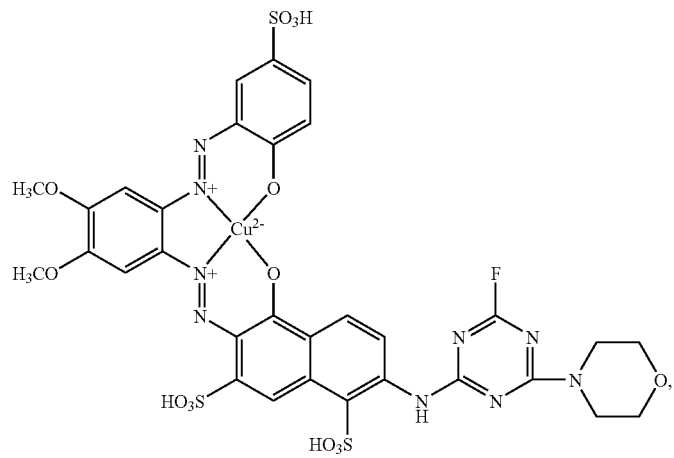
(102)
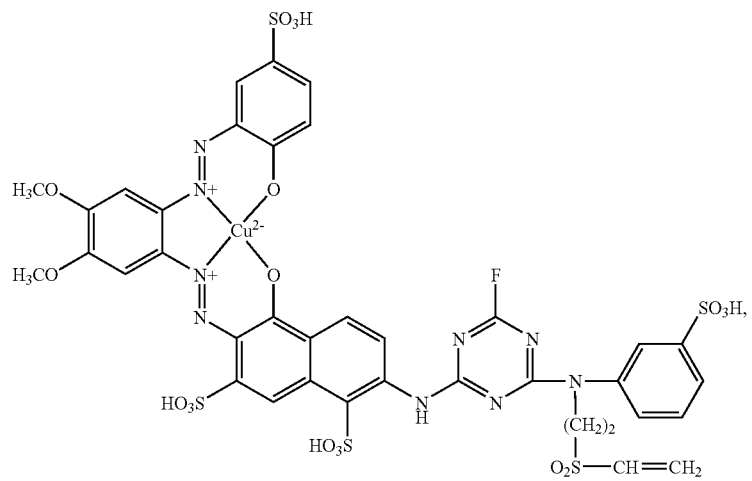
(103)
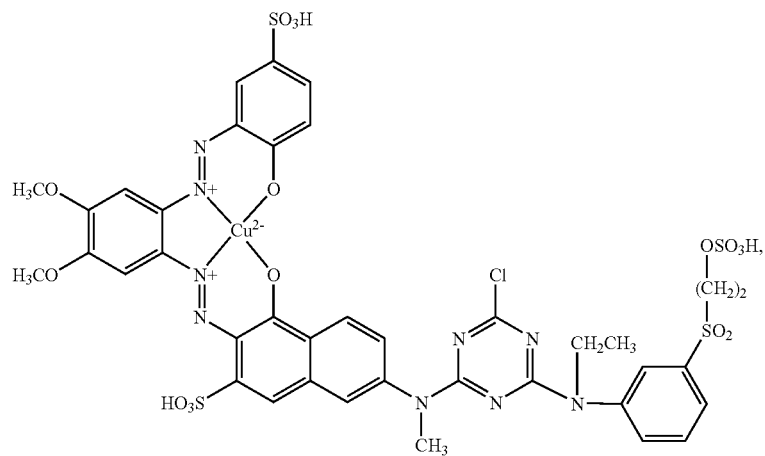

-continued
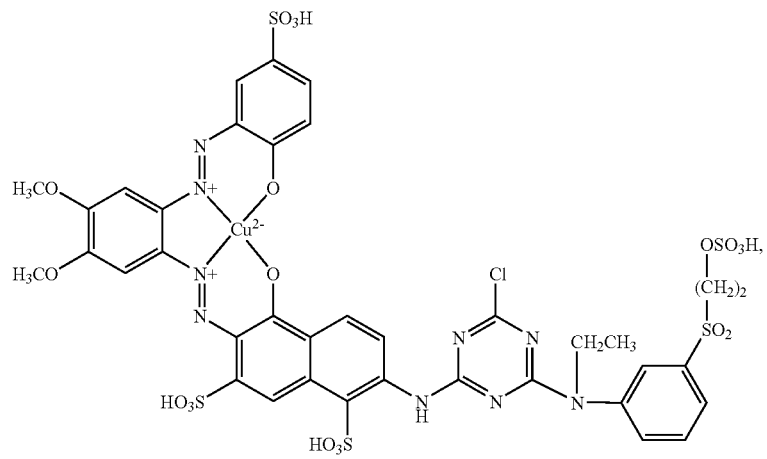
(104)
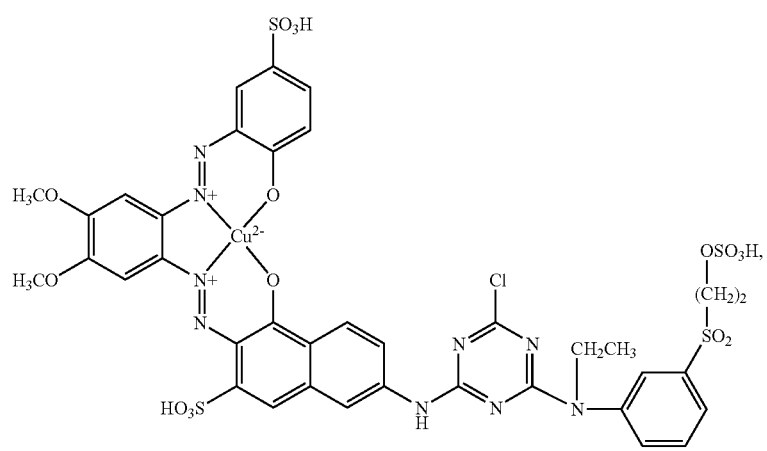
(105)
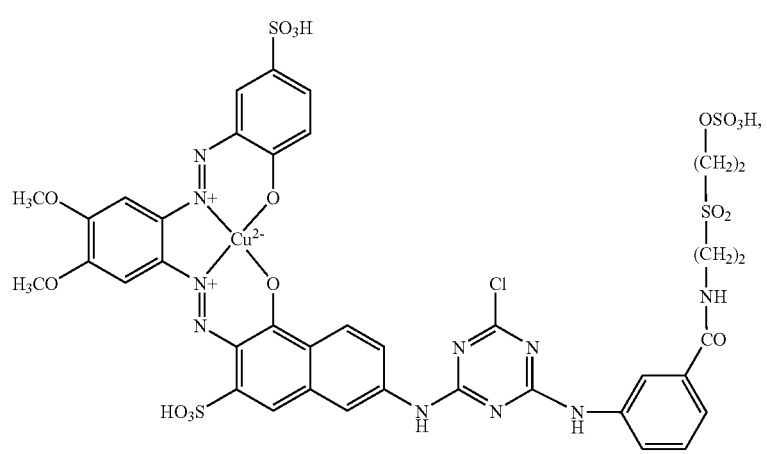
(106)

-continued
(107)
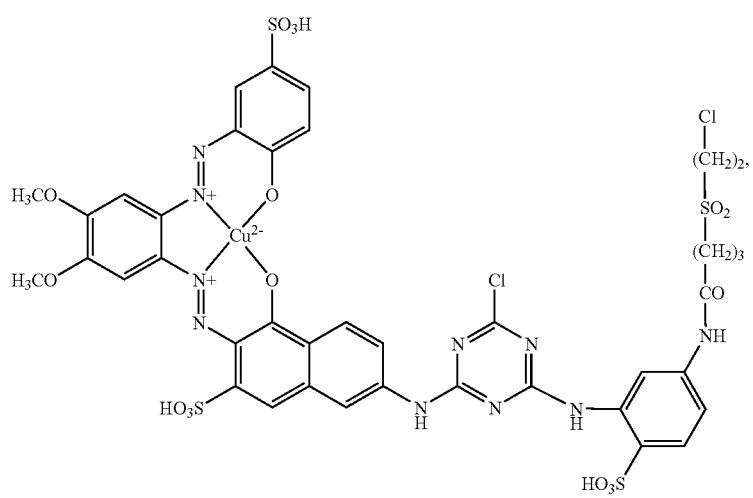
(108)
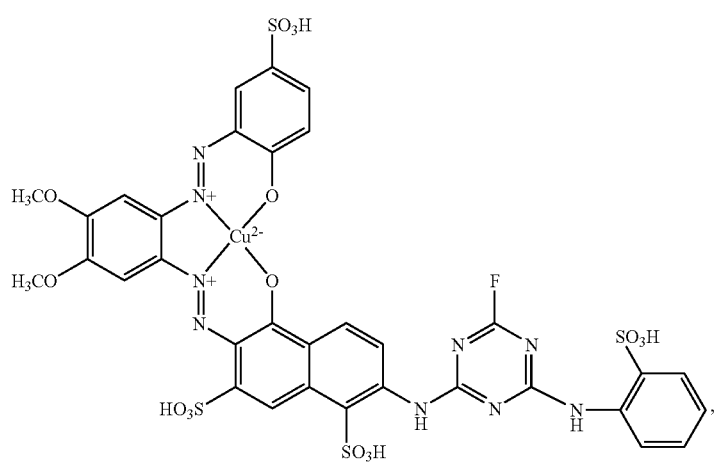
(109)
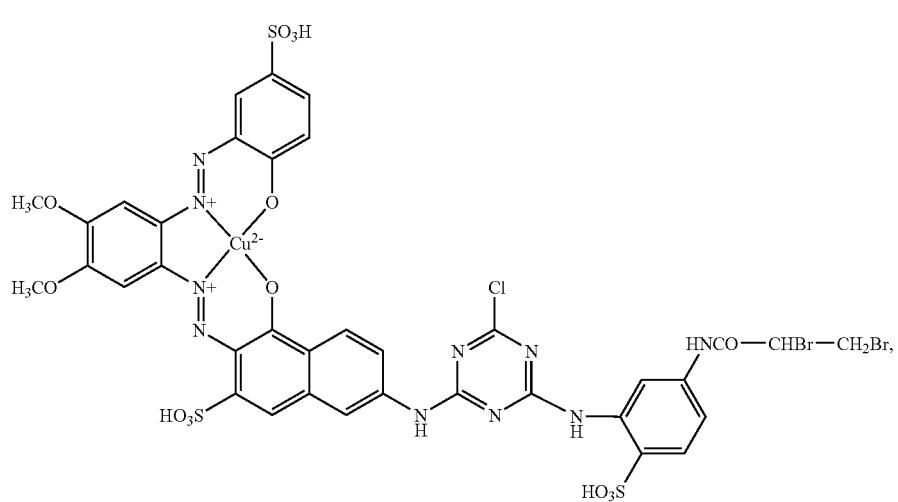

-continued
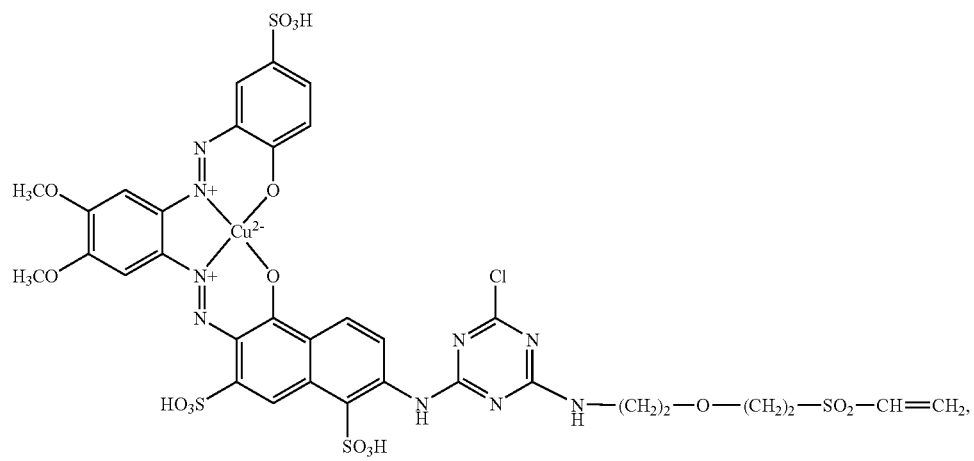
(110)
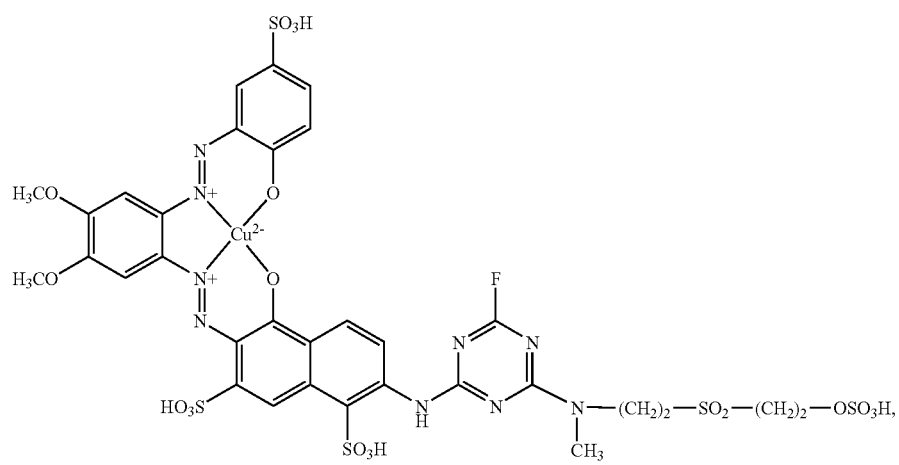
(111)
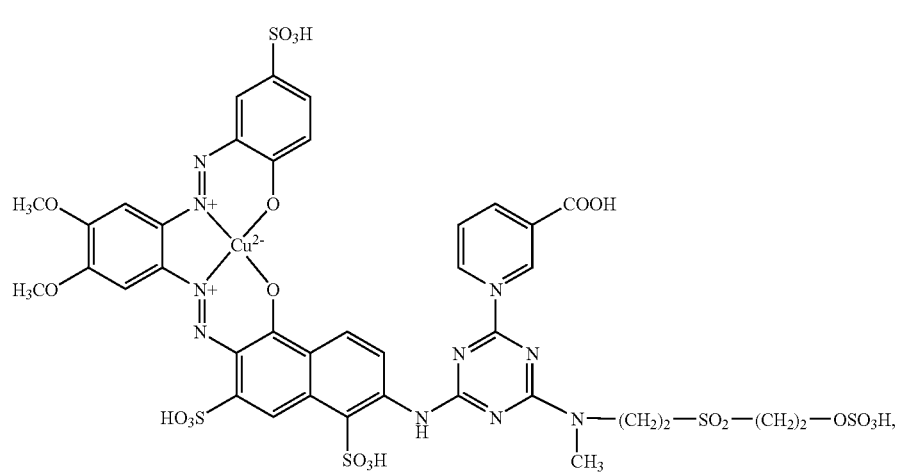
(112)

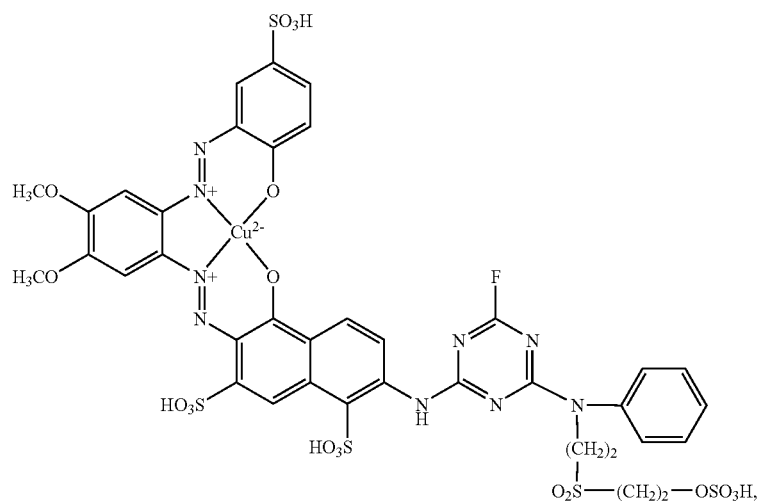
(113)
preferably a dye of formula (103), (104) or (105).
The dye of formula (2) is, for example, a dye of formula
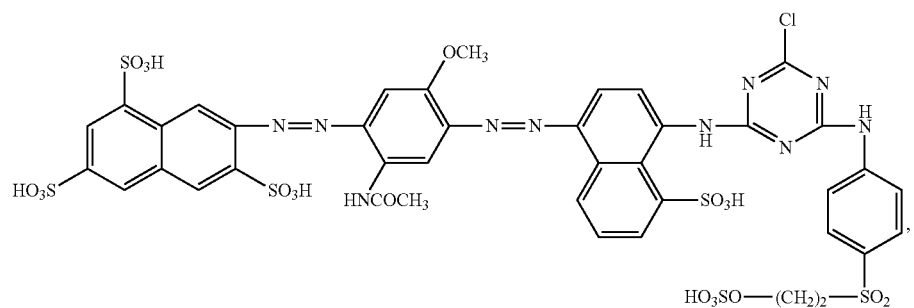
(201)
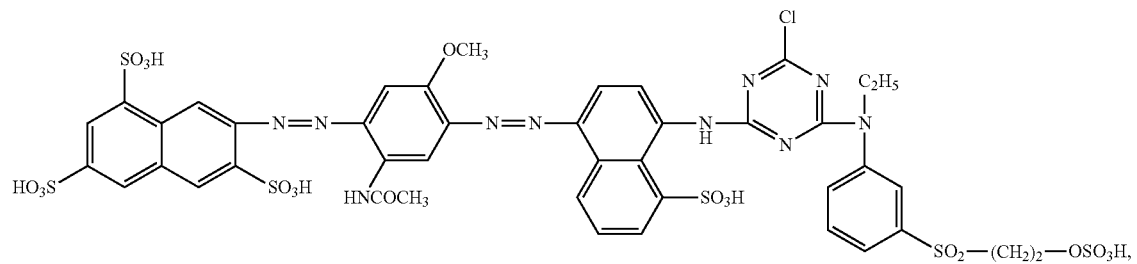
(202)
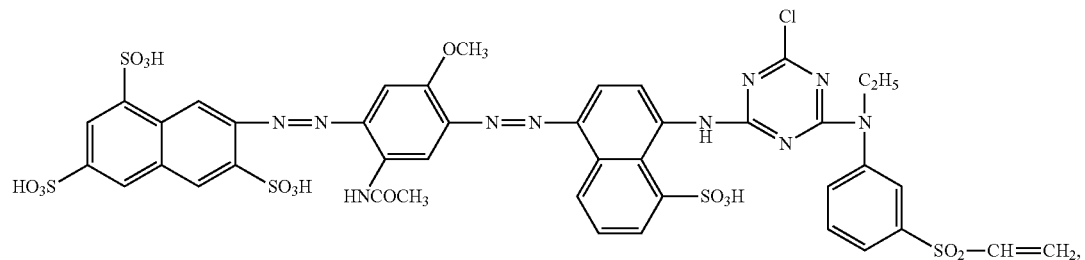
(203)

(204)
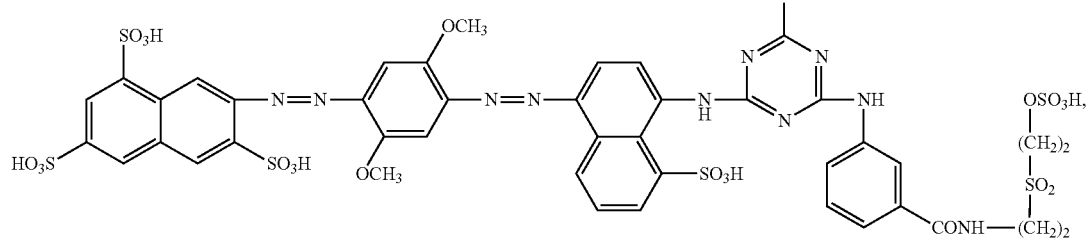
(205)
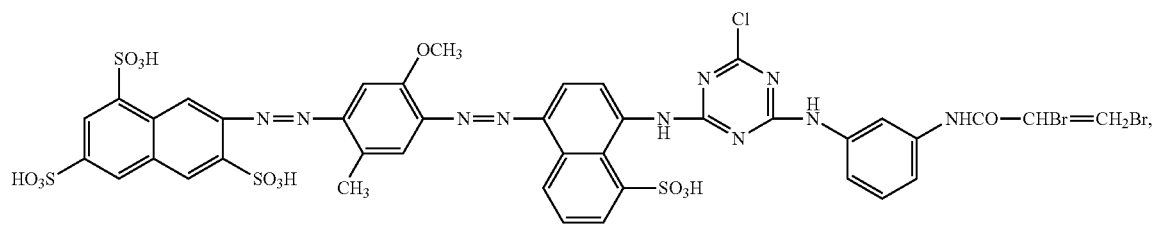
(206)
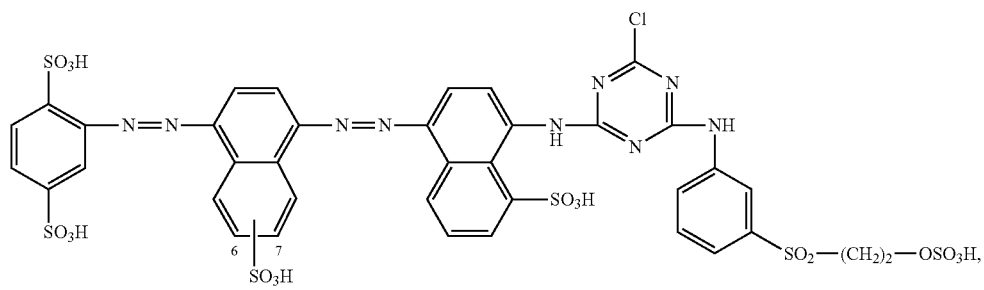
(207)
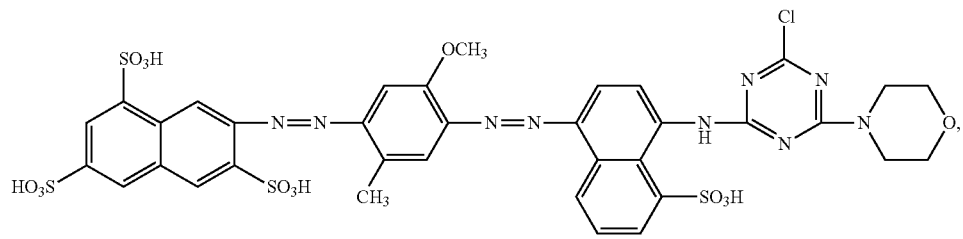
preferably a dye of formula (201), (202), (203) or (206).
The dye of formula (3) is, for example, a dye of formula
(301)
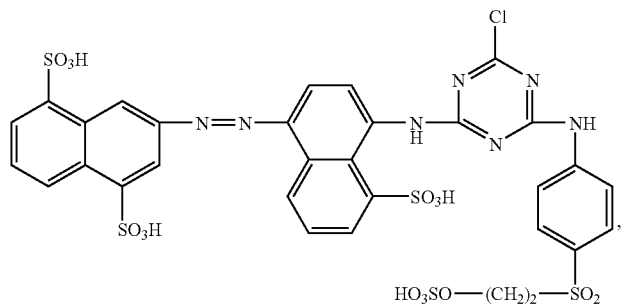

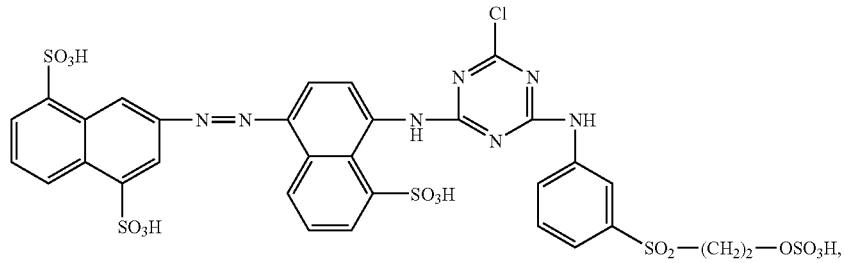

(302)

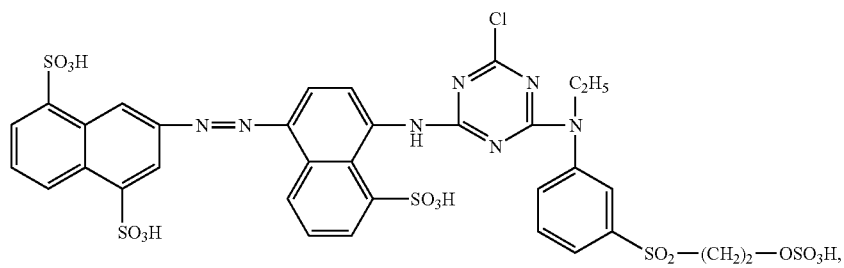

(303)

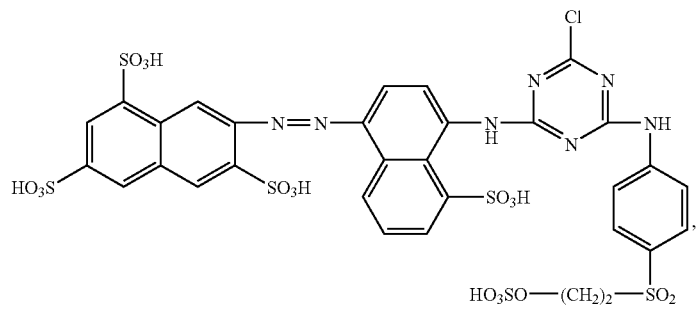

(304)

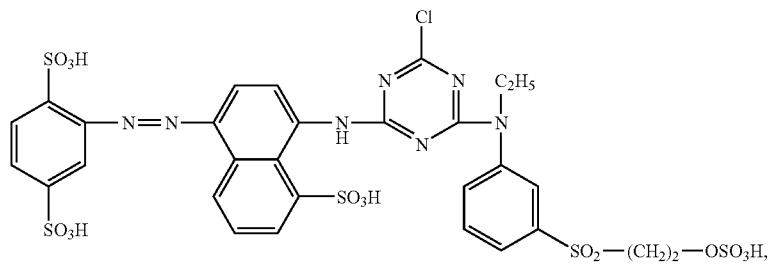

(305)

preferably a dye of formula (302) or (303).

The reactive dyes of formulae (1) to (3) in the dye mixtures according to the invention contain sulfo groups which are in each case either in the form of the free sulfonic acid or preferably in the form of a salt thereof, for example in the form of a sodium, lithium, potassium or ammonium salt or in the form of a salt of an organic amine, for example a triethanol-ammonium salt.

The dyes of formulae (1), (2) and (3) are known in some cases or they can be prepared in accordance with processes known per se. Dyes of formula (1) are disclosed, for example, in US 2003/0191294 A1 and U.S. Pat. No. 4,772,687.

The present invention also relates to dyes of formula

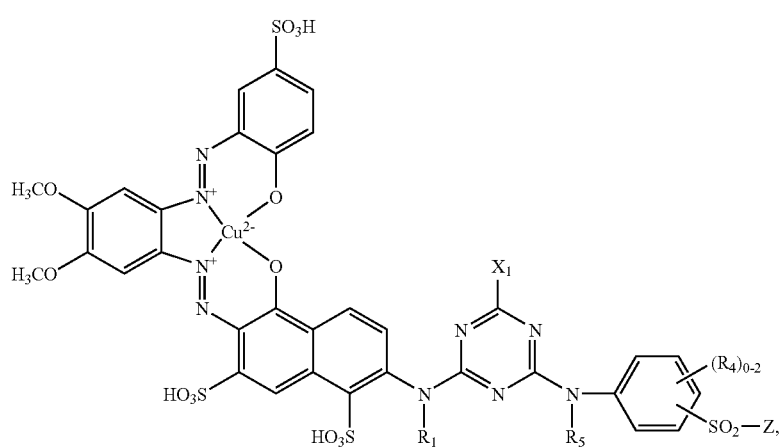

(1b)

wherein
$R_1$, $(R_4)_{0-2}$ and Z each have the meanings and preferred meanings defined above,
$R_5$ is hydrogen, methyl or ethyl, and
$X_1$ is halogen and halogen has the meanings and preferred meanings defined above for $X_1$.

The radical formula

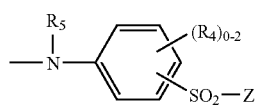

in the dyes of formula (1b) is preferably a radical of the formula (4c'), (4c") or (4c"') given above, especially preferably (4c') or (4c"), wherein Z has the definitions and preferred meanings given above.

Preferred among the dyes of formula (1b) is the dye of formula (104).

The reactive dyes of formula (1b) can be obtained, for example, by reacting with one another, in any order, an amino compound of formula

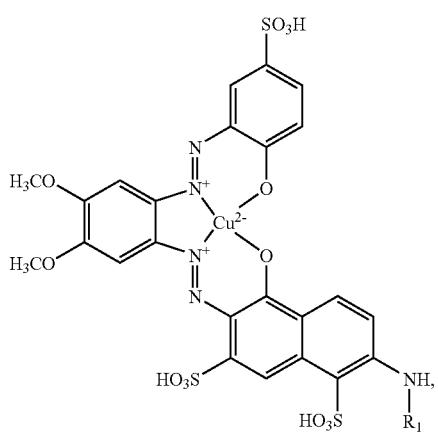

(5)

a compound of formula

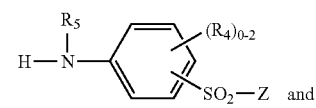

(6)

and a compound of formula

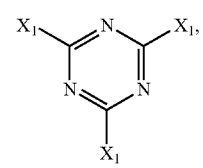

(7)

wherein $R_1$, $(R_4)_{0-2}$, $R_5$, $X_1$ and Z each have the meanings and preferred meanings defined above.

A variant of the process comprises first condensing one of the compounds of formulae (5) and (6) with a compound of formula (7) and reacting the resulting reaction product with the other compound of formula (5) and (6), which has been condensed beforehand with the compound of formula (7).

The present invention also relates to dyes of formula

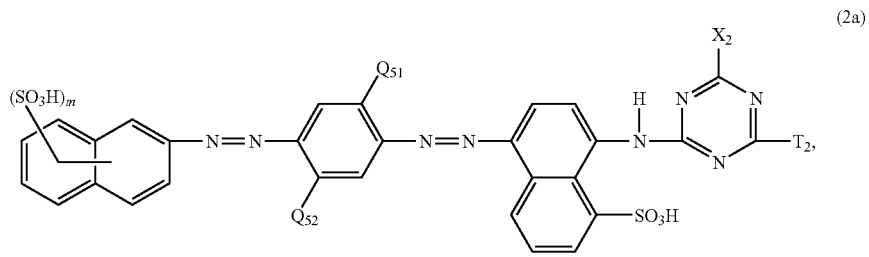
(2a)

wherein
$Q_{51}$, $Q_{52}$, $T_2$ and m each have the meanings and preferred meanings defined above, and
$X_2$ is halogen and halogen has the meanings and preferred meanings defined above for $X_2$.

The reactive dyes of formula (2a) can be obtained, for example, by reacting with one another, in any order,
an amino compound of formula

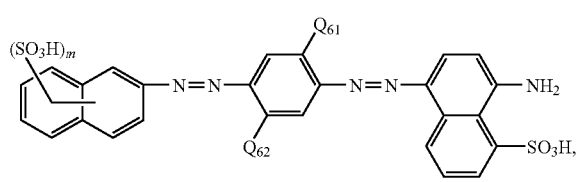
(8)

a compound of formula

T$_2$-H    (9) and a compound of formula

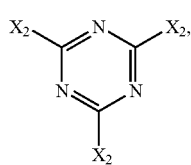
(10)

wherein
$Q_{51}$, $Q_{52}$, $X_2$, $T_2$ and m each have the meanings and preferred meanings defined above.

A variant of the process comprises first condensing one of the compounds of formulae (8) and (9) with a compound of formula (10) and reacting the resulting reaction product with the other compound of formula (8) and (9), which has been condensed beforehand with the compound of formula (10).

The present invention relates also to dyes of formula

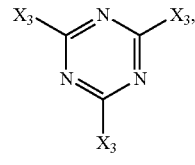
(3)

wherein
$T_3$ and t each have the meanings and preferred meanings defined above, and
$X_3$ is halogen and halogen has the meanings and preferred meanings defined above for $X_3$.

The reactive dyes of formula (3) can be obtained in a manner analogous to the compounds of formula (2a), for example by reacting with one another, in any order, an amino compound of formula

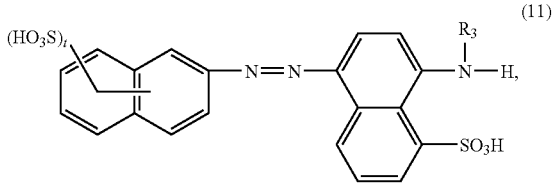
(11)

a compound of formula

T$_3$-H    (12), and a compound of formula (13)

wherein $X_3$, $T_3$ and t each have the meanings and preferred meanings defined above.

A variant of the process comprises first condensing one of the compounds of formulae (11) and (12) with a compound of formula (13) and reacting the resulting reaction product with the other compound of formula (11) and (12), which has been condensed beforehand with the compound of formula (13).

In the preparation of a reactive dye of formula (1b), (2a) or (3) there are preferably used equimolar amounts of compounds of formulae (5), (6) and (7), or of formulae (8), (9) and (10), or of formulae (11), (12) and (13).

The condensation reactions between the compounds of formulae (5), (6) and (7), or between the compounds of formulae (8), (9) and (10), or between the compounds of formulae (11), (12) and (13) are generally carried out analogously to known processes, usually in aqueous solution at temperatures of, for example, from 0 to 70° C. and a pH of, for example, from 3 to 10. The compounds of formulae (5) and (6), or of formulae (8) and (9), or of formulae (11) and (12), as well as the cyanuric halides of formula (7), or of formula (10), or of formula (13) are known or can be prepared analogously to known compounds.

The end product can optionally also be subjected to a transformation reaction. Such a trans-formation reaction is, for example, the conversion of a vinylatable reactive group $T_1$ or $T_2$ (Z or Q) or Z into its vinyl form by treatment with dilute sodium hydroxide solution, such as, for example, the conversion of the β-sulfatoethylsulfonyl or β-chloroethylsulfonyl group into the vinylsulfonyl radical or the conversion of the α,β-dihalopropionylamino group into the α-halo-acryloylamino radical. Such reactions are known per se. Those transformation reactions are generally effected in a neutral to alkaline medium at a temperature of, for example, from 20 to 70° C., at a pH of, for example, from 6 to 14.

As cyanuric halides of formulae (7), (10) and of formula (13) there are suitable, for example, cyanuric chloride and cyanuric fluoride.

The dye mixtures according to the invention can be prepared, for example, by mixing the individual dyes together. The mixing procedure is effected, for example, in suitable mills, e.g. ball mills or pin mills, as well as in kneaders or mixers. The dye mixtures according to the invention can also be prepared, for example, by dissolving the reactive dyes of formulae (1), (2) and (3) directly in the dyebath or the printing medium. The amount of the individual reactive dyes is governed by the shade to be obtained. The dye of formula (1) and the total amount of the dyes of formulae (2) and (3) are present in the dye mixtures according to the invention in a ratio by weight of, for example, from 1:99 to 99:1, preferably from 5:95 to 95:5 and especially from 10:90 to 90:10.

The reactive dyes of formulae (1), (2) and (3) and accordingly also the dye mixtures according to the invention may comprise further additives, for example sodium chloride or dextrin.

If desired, the reactive dyes of formulae (1), (2) and (3) and the dye mixtures according to the invention may comprise further auxiliaries which, for example, improve handling or increase storage stability, such as buffers, dispersants or anti-dusts. Such auxiliaries are known to the person skilled in the art.

The dye mixtures according to the invention and the reactive dyes according to the invention are suitable for the dyeing and printing of an extremely wide variety of materials, especially hydroxy-group-containing or nitrogen-containing fibre materials. Examples thereof are paper, silk, leather, wool, polyamide fibres and polyurethanes as well as, especially, cellulosic fibre materials of all kinds. Such fibre materials are, for example, natural cellulose fibres, such as cotton, linen and hemp, as well as cellulose and regenerated cellulose. The dye mixtures according to the invention and the reactive dyes according to the invention are also suitable for the dyeing or printing of hydroxy-group-containing fibres that are contained in blend fabrics, for example mixtures of cotton with polyester fibres or polyamide fibres.

The present invention relates also to a method for the dichromatic or trichromatic dyeing or printing of hydroxy-group-containing or nitrogen-containing fibre materials, especially cellulosic fibre materials, which method comprises using at least one dye, for example one, two or three dyes, preferably one dye, of the above-mentioned formula (1), together with at least one dye, for example one, two or three dyes, from the group of the above-mentioned formulae (2) and (3), wherein $Q_1$, $Q_2$, $Q_3$, $Q_4$, $Q_5$, $R_1$, $R_2$, $R_3$, $X_1$, $X_2$, $X_3$, $T_1$, $T_2$, $T_3$, k, m, n, p, q and t each have the meanings and preferred meanings defined above.

Preference is given to corresponding methods for the trichromatic dyeing or printing of hydroxy-group-containing or nitrogen-containing fibre materials wherein at least one dye of the above-mentioned formula (1) is used together with at least one dye of the above-mentioned formula (2) and together with at least one dye of the above-mentioned formula (3).

The dyes or dye mixtures according to the invention are suitable for customary dyeing and printing methods and can be applied to the fibre material and fixed thereto in a wide variety of ways, especially in the form of aqueous dye solutions or print pastes. Accordingly, the method according to the invention for dichromatic or trichromatic dyeing or printing can also be carried out in accordance with customary dyeing or printing methods. The resulting dye solutions are suitable both for the exhaust method and for pad-dyeing, in which the goods are impregnated with aqueous, optionally salt-containing dye solutions, and the dyes are fixed after an alkali treatment or in the presence of alkali, optionally under the action of heat. The dyes and dye mixtures according to the invention and the method for dichromatic or trichromatic dyeing according to the invention are likewise suitable for the so-called cold pad-batch process, in which the dye is applied, together with the alkali, on the padder and is then fixed by storage for several hours at room temperature.

The dye liquors or print pastes, in addition to containing water and the dyes, may also comprise further additives, for example toning dyes known per se, salts, buffer substances, wetting agents, anti-foams, levelling agents or agents that influence the properties of the textile material, for example softeners, additives for flame-resistant finishes or dirt-, water- or oil-repellants, as well as water-softeners and natural or synthetic thickeners, e.g. alginates or cellulose ethers.

The amounts in which the individual dyes are used in the dyebaths or print pastes can vary within wide limits in dependence upon the desired depth of shade; in general, amounts of from 0.01 to 15% by weight, especially from 0.1 to 10% by weight, based on the goods being dyed or on the print paste, have proved advantageous.

The dyes of formulae (1), (2) and (3) used in the method according to the invention and the dyes of formulae (1b), (2a) and (3) according to the invention are distinguished in dichromatic or trichromatic dyeing or printing by uniform colour build-up, good exhaustion and fixing behaviour, good constancy of shade even in different concentrations, good fastness properties and, in particular, very good combinability. The dyeings and prints produced in accordance with the method of the invention have very good reproducibility.

The said textile material may be in an extremely wide variety of processing forms, such as, for example, in the form of fibres, yarn, woven fabric or knitted fabric.

The dyeings and prints produced using the dyes and dye mixtures according to the invention exhibit good light fastness and very good wet-fastness properties, such as fastness to washing, to water, to sea water, to cross-dyeing and to perspiration, as well as good fastness to chlorine, to pleating, to hot-pressing and to rubbing.

The dyes and dye mixtures according to the invention are also suitable as colorants for use in recording systems. Such recording systems are, for example, commercially available inkjet printers for paper or textile printing, or writing implements, such as fountain pens or ballpoint pens, and especially ink-jet printers. For that purpose, the dye mixture according to the invention or the dyes according to the invention are first converted into a form suitable for use in recording systems. A suitable form is, for example, an aqueous ink comprising at least one dye of the mixture according to the invention or the dyes according to the invention as colorant. The inks can be prepared in customary manner by mixing together the individual constituents customary in ink-jet printing in the desired amount of water. Conveniently, individual inks, comprising at least one dye of formulae (1), (2) and (3), are used in a multi color ink-jet printer and mixing is effected on the substrate by digital printing. For example, one ink comprises a dye of formula (1). Another ink comprises a dye of formula (2) and still another ink comprises a dye of formula (3).

Examples of substrates that come into consideration for ink-jet printing, in addition to paper or plastics films, include the above-mentioned hydroxy-group-containing or nitrogen-containing fibre materials, especially cellulosic fibre materials. The substrates are preferably textile fibre materials.

The following Examples serve to illustrate the invention. Unless otherwise indicated, temperatures are given in degrees Celsius, parts are parts by weight and percentages relate to percent by weight. Parts by weight relate to parts by volume in a ratio of kilograms to liters.

EXAMPLE 1

(a) 18.4 parts of cyanuric chloride are suspended in the course of from 10 to 15 minutes at a temperature of from 0 to 2° C. in 190 parts of ice, 90 parts of water and 0.1 part of $Na_2HPO_4 \times 12H_2O$. In the course of 45 minutes at a temperature of from 0 to 2° C., a solution of 74.5 parts of the compound of formula

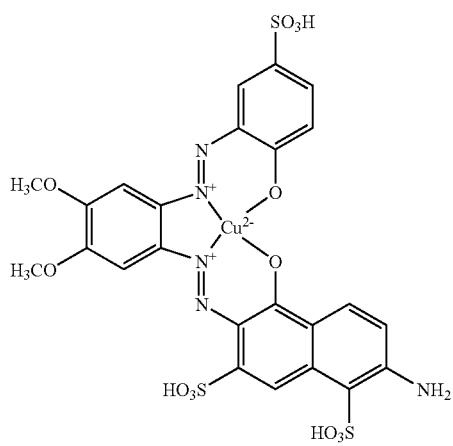

(5a)

in 600 parts of water and 70.8 parts of an aqueous 2N sodium hydroxide solution is then fed in, the pH being maintained at a value of from 5 to 7 by the addition of aqueous 2N sodium hydroxide solution. Stirring is then carried out for 2 to 3 hours at a temperature of from 5 to 20° C. A solution is obtained, which comprises the compound, indicated in the form of the free acid, of formula

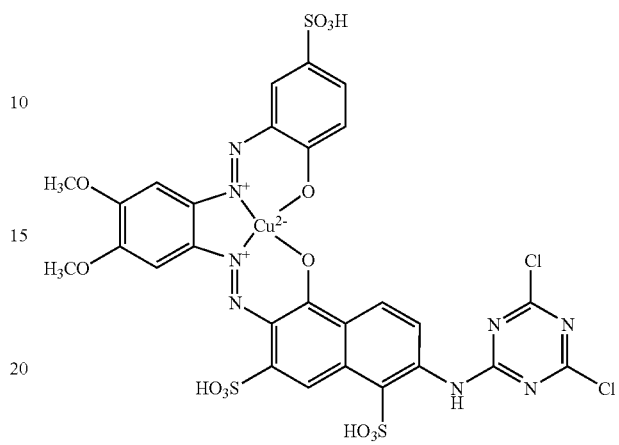

The compound of formula (5a) is obtained according to the procedure described in US 2003/0191294 A1.

(b) 32.8 parts of a compound of formula

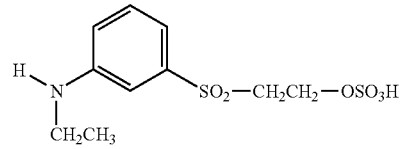

are dissolved in 560 parts of water. The resulting solution is added dropwise in the course of 45 minutes to the solution obtained according to (a). During the addition, the pH is maintained at a value of 6 by means of aqueous 2N sodium hydroxide solution. Stirring is then carried out for several hours at a temperature of from 40 to 60° C. and a pH value of from 5 to 7. The reaction mixture is clarified by filtration, freed of salt by dialysis and concentrated, yielding a compound which, in the form of the free acid, corresponds to formula

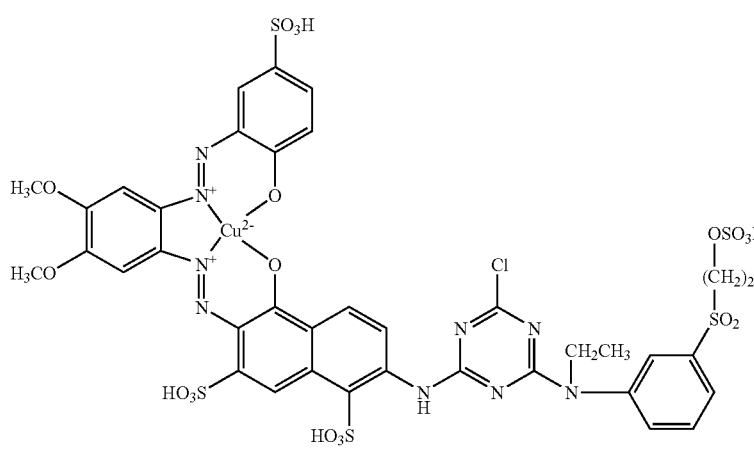

(104)

($\lambda_{max}$=455 nm) and dyes cotton in an olive shade having good all-round fastness properties.

EXAMPLE 2

(a) 38.4 parts of 2-naphthylamine-3,6,8-trisulfonic acid are homogenised in 80 parts of water, and 12 parts of concentrated hydrochloric acid are added. The temperature of the mixture is adjusted to 10° C. with 20 parts of ice. 25 parts of 4N sodium nitrite solution are slowly added to the resulting mixture at a temperature of 10-25° C.
(b) The diazo suspension obtained according to step (a) is added at a temperature of 15-25° C. to a mixture of 18 parts of 3-amino-4-methoxyacetanilide in 100 parts of water, the pH being maintained at 5.5 by addition of a soda solution.
(c) 22 parts of concentrated hydrochloric acid and 40 parts of ice are added to the solution obtained according to step (b), and then 26 parts of 4N sodium nitrite solution are slowly added at a temperature of 15-20° C.
(d) The diazo solution obtained according to step (c) is slowly added, at pH 6.2 to 6.5 and a temperature of 20-25° C., to a mixture of 22.3 parts of 1-naphthylamine-8-sulfonic acid in 150 parts of water and 10 parts of 30% sodium hydroxide solution. The resulting dye is then precipitated by addition of 90 parts of sodium chloride. Filtration and washing of the precipitate yields 150 parts of a moist product which, in the form of the free acid, corresponds to a dye radical of formula

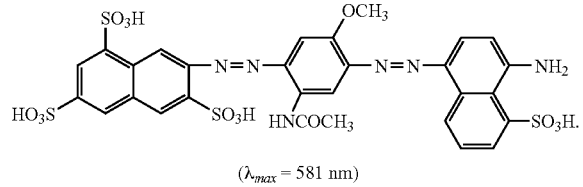

(8a)

($\lambda_{max}$ = 581 nm)

EXAMPLE 3

(a) 18.4 parts of cyanuric chloride are suspended in the course of from 10 to 15 minutes at a temperature of from 0 to 2° C. in 190 parts of ice, 90 parts of water and 0.1 part of $Na_2HPO_4 \times 12H_2O$. In the course of 45 minutes at a temperature of from 0 to 2° C., a solution of the compound of formula (8a) obtained according to Example 2(d) in 600 parts of water and 70.8 parts of an aqueous 2N sodium hydroxide solution is then fed in, the pH being maintained at a value of 5 by the addition of aqueous 2N sodium hydroxide solution. Stirring is then carried out for 40 minutes at a temperature of from 0 to 20° C. A solution is obtained, which comprises the compound, indicated in the form of the free acid, of formula

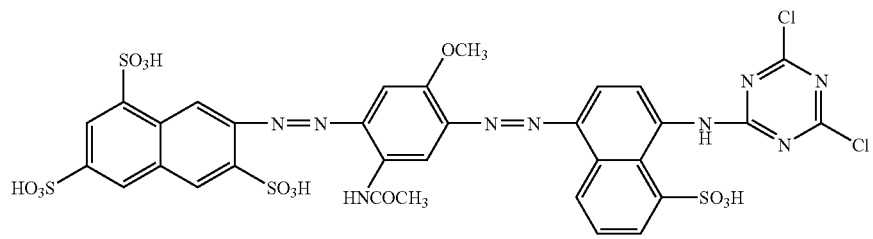

(b) 32.8 parts of a compound of formula

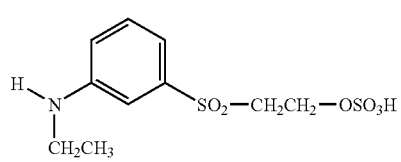

are dissolved in 560 parts of water. The resulting solution is added dropwise in the course of 45 minutes to the solution obtained according to (a). During the addition, the pH is maintained at a value of 6 by means of aqueous 2N sodium hydroxide solution. Stirring is then carried out overnight at a temperature of from 50 to 70° C. and a pH value of 6. For the purpose of converting the β-sulfatoethylsulfonyl form into the vinyl form, the pH value is adjusted to 10 using 2N sodium hydroxide solution and stirred for 30 minutes at a temperature of from 30 to 45° C. The reaction mixture is then rendered neutral using dilute hydrochloric acid, clarified by filtration, freed of salt by dialysis and concentrated, yielding a compound which, in the form of the free acid, corresponds to formula

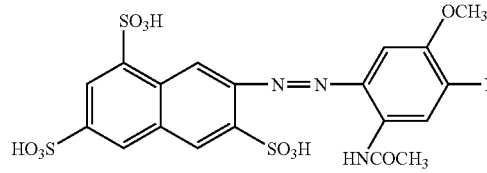
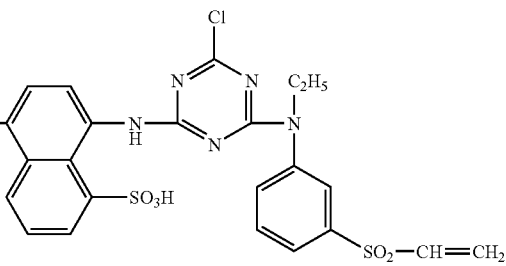

(203)

($\lambda_{max}$=488 nm) and dyes cotton in a brown shade having good all-round fastness properties. The dye of formula (203) is the vinylated form of the dye of formula (202).

EXAMPLES 4 TO 9

In a manner analogous to that described in Examples 2 and 3, the dyes of the above-mentioned formulae (201)$\lambda_{max}$=490 nm, (202)$\lambda_{max}$=494 nm, (204)$\lambda$max=498 nm, (205)$\lambda_{max}$=496 nm, (206)$\lambda_{max}$=490 nm and (207)$\lambda_{max}$=501 nm are obtained which dye cotton in brown shades having good all-round fastness properties.

EXAMPLE 10

(a) 30.4 parts of 2-naphthylamine-4,8-disulfonic acid are dissolved in 125 parts of water with 13.3 parts of 30% sodium hydroxide solution to form a neutral solution. 30 parts of 4N sodium nitrite solution are added to the resulting solution. The solution obtained is slowly added dropwise to a mixture of 35 parts of ice and 28 parts of concentrated hydrochloric acid. Stirring is carried out for a further 30 minutes and any excess nitrite is destroyed.

(b) At a temperature of 5-15° C. and a pH of from 3.0 to 4.0, a neutral solution of 22.3 parts of 1-naphthylamine-8-sulfonic acid in 140 parts of water and 16.5 parts of 30% sodium hydroxide solution is metered into the diazo suspension obtained according to step (a) and stirring is then carried out for 30 minutes at pH 3.5. The reaction solution contains a dye radical which, in the form of the free acid, corresponds to formula

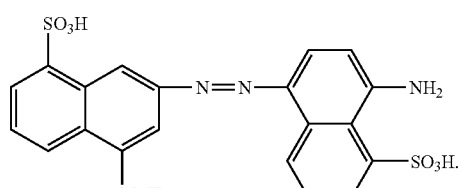

(11a)

($\lambda_{max}$ = 497 nm)

EXAMPLE 11

(a) A neutral solution of 28.1 parts of 4-(β-sulfatoethylsulfonyl)aniline in 100 parts of water is added to a suspension obtained by stirring a solution of 19.5 parts of cyanuric chloride in 80 parts of acetone into a mixture of 200 parts of water and 200 parts of ice. The condensation reaction is continued for one hour, with stirring, at from 0 to 5° C. and a pH of from 3 to 4. The pH is maintained at that value by addition of sodium hydrogen carbonate.

(b) The neutral solution obtained according to Example 10(b) is added to the suspension obtained according to (a) and stirring is carried out for several hours at a temperature of from 50 to 60° C. and a pH of from 5 to 7. The reaction mixture is then clarified by filtration, freed of salt by dialysis and concentrated, yielding a compound which, in the form of the free acid, corresponds to formula

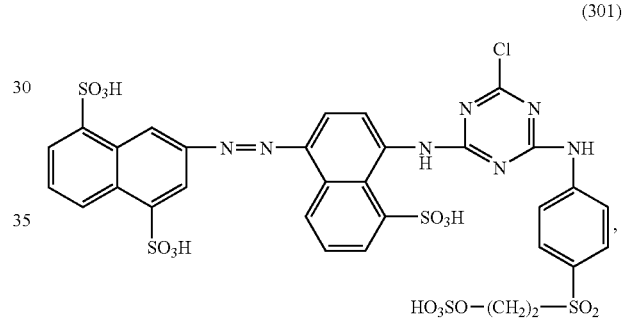

(301)

($\lambda_{max}$=408 nm) and dyes cotton in a yellow shade having good all-round fastness properties.

EXAMPLES 12 TO 14

In a manner analogous to that described in Examples 10 and 11, the dyes of the above-mentioned formulae (302) $\lambda^{max}$=406 nm, (303)$\lambda_{max}$=412 nm, (304)$\lambda_{max}$=428 nm and (305)$\lambda_{max}$=418 nm are obtained which dye cotton in yellow shades having good all-round fastness properties.

Dyeing Procedure I: Exhaust Method 100 parts of cotton fabric are placed at 60° C. in 1500 parts of a dyebath containing 45 g/l of sodium chloride and 2 parts of the reactive dye of formula (203) obtained according to Examples 2 and 3. After 45 minutes at 60° C., 20 g/l of calcined soda are added. Dyeing is continued at that temperature for a further 45 minutes. The dyed goods are then rinsed, soaped at boiling for a quarter of an hour with a non-ionic detergent, rinsed again and dried.

As an alternative to that procedure, dyeing can be carried out at 80° C. instead of at 60° C.

Dyeing Procedure II: Exhaust Method 0.1 part of the dye of formula (203) according to Examples 2 and 3 is dissolved in 200 parts of water, and 0.5 part of sodium sulfate, 0.1 part of a levelling agent (based on the condensation product of a higher aliphatic amine and ethylene oxide) and 0.5 part of sodium acetate are added. The pH is then adjusted to a value of 5.5 with acetic acid (80%). The dyebath is heated at 50° C. for 10 minutes and then 10 parts of a woollen fabric are added. The dyebath is heated to a temperature of 100° C. within a period of about 50 minutes and dyeing is carried out at that temperature for 60 minutes. The dyebath is then cooled to 90° C. and the dyed goods are removed. The woollen fabric is washed with warm and cold water, then spun and dried.

Dyeing Procedure III: Pad-Batch

On a padder having a squeezing effect of 75% liquor pick-up, a bleached cotton cretonne fabric is impregnated with an aqueous liquor containing, per liter, X g of the dyestuff of formula (104) according to Example 1 (see Table 1 below), 1.0 g of a wetting agent (Cibaflow PAD), Y ml of sodium hydroxide 36° Bé (see Table 1 below) and 70 ml of sodium silicate 38° Bé. The immersion time is 2 seconds. After padding, the fabric is rolled up and then stored for 24 hours at a temperature of 25° C. After storage, the dyed cotton material is cold-rinsed with water (10 min), boiled in water (5 min) and subsequently cold-rinsed with water (10 min). Olive shaded fabrics of different colour depths dependent on the dyestuff concentration (X g/l) as given in Table 1 are obtained.

TABLE 1 dependence of reference depth (RD) from dyestuff concentration

| | Dyestuff* Xg/l | | | | |
| --- | --- | --- | --- | --- | --- |
| | 10 | 20 | 40 | 60 | 80 |
| NaOH Y ml/l 36°Bé | 15 | 18 | 24 | 30 | 33 |
| RD Dyestuff of formula (104) | 0.31 | 0.54 | 0.97 | 1.29 | 1.51 |

*$E_{25}$ = 0.273 ($E_{25}$ means the extinction at $\lambda_{max}/c$ = 25 mg/l)

Bleached cotton cretonne fabrics dyed according to the above method either with 18 g/l of the dyestuff of formula (104) (reference depth: 0.49) or with 20 g/l of the dyestuff of formula

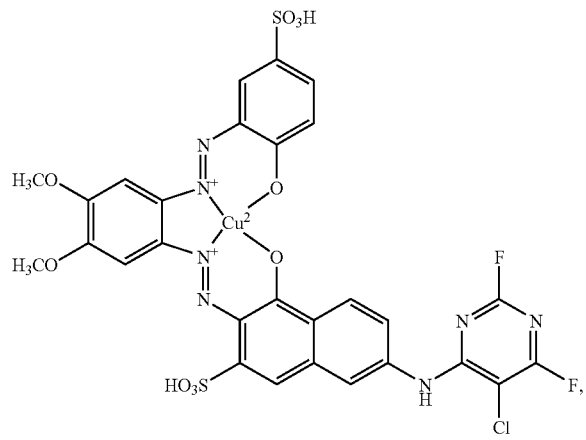

(114)

(reference depth: 0.45) are subjected to colour fastness test (Xenon arc fading test: 168 h of irradiation). Changes in colour are determined according to the Grey Scale. The fabric dyed with the dyestuff of formula (104) according to the present invention is rated 5-6, whereas the fabric dyed with the dyestuff of formula (114) is rated 5.

Dyeing Procedure IV: Pad-Batch

On a padder having a squeezing effect of 75% liquor pick-up, a bleached cotton cretonne fabric is impregnated with an aqueous liquor containing, per liter, X g of the dyestuff of formula (202) obtained in analogy to Examples 2 and 3 (see Table 2 below), 1 g of a wetting agent (Cibaflow PAD), Y ml of sodium hydroxide 36° Bé (see Table 2 below) and 70 ml of sodium silicate 38° Bé. The immersion time is 2 seconds. After padding, the fabric is rolled up and then stored for 24 hours at a temperature of 25° C. After storage, the dyed cotton material is cold-rinsed with water (10 min), boiled in water (5 min) and subsequently cold-rinsed with water (10 min). Brown shaded fabrics of different colour depths dependent on the dyestuff concentration (X g/l) as given in Table 2 are obtained.

TABLE 2 dependence of reference depth (RD) from dyestuff concentration

| | Dyestuff* Xg/l | | | | |
| --- | --- | --- | --- | --- | --- |
| | 10 | 20 | 40 | 60 | 80 |
| NaOH Y ml/l 36°Bé | 15 | 18 | 24 | 30 | 33 |
| RD Dyestuff of formula (203) | 0.39 | 0.76 | 1.34 | 1.50 | 1.77 |

*$E_{25}$ = 0.312 ($E_{25}$ means the extinction at $\lambda_{max}/c$ = 25 mg/l)

A bleached cotton cretonne fabric dyed according to the above method with 27.6 g/l of the dyestuff of formula (202) (reference depth: 0.99) is subjected to colour fastness test (Xenon arc fading test: 168 h of irradiation). Changes in colour are determined according to the Grey Scale. The fabric is rated 5.

Dyeing Procedure V: Exhaust

X % (see Table 3 below) of the dyestuff of formula (303) obtained in analogy to Examples 10 and 11 are dissolved in 400 parts of water. To this solution are added 600 parts of a solution which contains Y g/l (see Table 3 below) of common salt (sodium chloride). 100 parts of bleached cotton tricot are introduced into the dye bath at 30° C. The temperature is maintained for 20 minutes and then increased to 80° C. within 35 minutes. After 30 minutes at 80° C. 100 parts of a solution containing Z g/l (see Table 3 below) of calcined sodium carbonate (soda ash) are added. Dyeing is continued for further 45 minutes at this temperature. The dyed goods are then rinsed, soaped at the boil for 20 minutes with a non-ionic detergent, rinsed again and dried. Yellow shaded fabrics of different colour depths dependent on the dyestuff concentration (X %) as given in Table 4 are obtained.

TABLE 3

| Salt and Alkali Recommendations | | |
| --- | --- | --- |
| Dyestuff X % | Common Salt Y g/l | Soda ash Z g/l |
| 0.50 | 30 | 15 |
| 1.00 | 45 | 15 |
| 2.00 | 60 | 15 |
| 4.00 | 80 | 20 |
| 6.00 | 90 | 20 |
| 8.00 | 90 | 20 |

TABLE 4 dependence of reference depth (RD) from dyestuff concentration

| | Dyestuff* X % | | | | | |
|---|---|---|---|---|---|---|
| | 0.5 | 1.00 | 2.00 | 4.00 | 6.00 | 8.00 |
| RD Dyestuff of formula (303) | 0.26 | 0.51 | 0.94 | 1.84 | 2.22 | 2.46 |

*$E_{25} = 0.384$ ($E_{25}$ means the extinction at $\lambda_{max}/c = 25$ mg/l)

Bleached cotton tricot fabrics dyed according to the above method either with 2.12% of the dyestuff of formula (303) (reference depth: 1.01) or with 1.83% of the dyestuff of formula

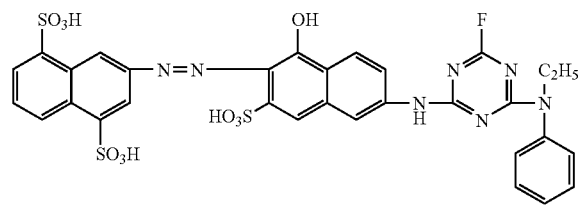

(306)

(reference depth: 0.90) are subjected to colour fastness test (Xenon arc fading test: 72 h of irradiation). Changes in colour are determined according to the Grey Scale. The fabric dyed with the dyestuff of formula (303) according to the present invention is rated 5-6, whereas the fabric dyed with the dyestuff of formula (306) is rated 3.

Printing Procedure

While stirring rapidly, 3 parts of the dye of formula (203) obtained according to Example 2 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed material is steamed in saturated steam at 102° C. for 2 minutes. The printed fabric is then rinsed, if desired soaped at boiling and again rinsed, and then dried.

Trichromatic Principle Example 1

Pad-Batch Method

On a padder having a squeezing effect of 70% liquor pick-up, a bleached cotton cretonne fabric is impregnated with an aqueous liquor containing, per liter, 1.5 g of the yellow-dyeing dye of formula (302),
0.5 g of the brown-dyeing dye of formula (203),
2.0 g of the olive-dyeing dye of formula (104),
1 g of a wetting agent,
5 g of sodium hydroxide and
80 g of sodium silicate 38° Bé.

The immersion time is 2 seconds. After padding, the fabric is rolled up and then stored for 12 hours at a temperature of 25° C. After storage, the dyed cotton material is cold-rinsed and then hot-rinsed with water, subsequently soaped, hot-rinsed and warm-rinsed. A light-khaki shade having very good fastness properties is obtained.

In a manner analogous to that described in Trichromatic Principle Example 1, instead of the yellow-dyeing dye of formula (302) it is possible to use the equivalent amount of a yellow-dyeing dye of formula (301), (303), (304) or (305). In that way there is likewise obtained a light-khaki shade having very good fastness properties.

In a manner analogous to that described in Trichromatic Principle Example 1, instead of the brown-dyeing dye of formula (203) it is possible to use the equivalent amount of a brown-dyeing dye of formula (201), (202), (204), (205), (206) or (207). In that way there is likewise obtained a light-khaki shade having very good fastness properties.

In a manner analogous to that described in Trichromatic Principle Example 1, instead of the olive-dyeing dye of formula (104) it is possible to use the equivalent amount of a dye of formula (101), (102), (103), (105), (106), (107), (108), (109), (110), (111), (112) or (113). In that way there is likewise obtained a light-khaki shade having very good fastness properties.

Trichromatic Principle Example 2

Pad-Steam Method

On a padder having a squeezing effect of 100% liquor pick-up, a bleached cotton terry fabric is impregnated with an aqueous liquor containing, per liter, 0.25 g of the yellow-dyeing dye of formula (302),
0.32 g of the brown-dyeing dye of formula (203),
0.59 g of the olive-dyeing dye of formula (104),
1 g of a wetting agent,
10 g of sodium chloride and
5 g of sodium carbonate.

The immersion time is 2.5 seconds. After padding, the fabric is steamed for one minute at 100° C. and then rinsed with water, subsequently soaped, hot-rinsed and warm-rinsed. A light-beige shade having very good fastness properties is obtained.

In a manner analogous to that described in Trichromatic Principle Example 2, instead of the yellow-dyeing dye of formula (302) it is possible to use the equivalent amount of a yellow-dyeing dye of formula (301), (303), (304) or (305). In that way there is likewise obtained a light-beige shade having very good fastness properties.

In a manner analogous to that described in Trichromatic Principle Example 2, instead of the brown-dyeing dye of formula (203) it is possible to use the equivalent amount of a brown-dyeing dye of formula (201), (202), (204), (205), (206) or (207). In that way there is likewise obtained a light-beige shade having very good fastness properties.

In a manner analogous to that described in Trichromatic Principle Example 2, instead of the olive-dyeing dye of formula (104) it is possible to use the equivalent amount of a dye of formula (101), (102), (103), (105), (106), (107), (108), (109), (110), (111), (112) or (113). In that way there is likewise obtained a light-beige shade having very good fastness properties.

Trichromatic Principle Example 3

Pad-Dry-Pad-Steam Method

On a padder having a squeezing effect of 65% liquor pick-up, a bleached cotton gabardine fabric is impregnated with an aqueous liquor containing, per liter, 3.30 g of the yellow-dyeing dye of formula (302), 7.90 g of the brown-dyeing dye of formula (203), 9.60 g of the olive-dyeing dye of formula (104), 1 g of a wetting agent and 10 g of a migration inhibitor (acrylate-based).

The immersion time is 2 seconds. After padding, the fabric is dried for one minute at 120° C. The dyed material is then impregnated with an aqueous liquor containing, per liter, 200 g of sodium chloride, 5 g of sodium hydroxide and 20 g of sodium carbonate.

The immersion time is 2 seconds. After padding, the fabric is steamed for one minute at 100° C. and then rinsed with water, subsequently soaped, hot-rinsed and warm-rinsed.

A brown shade having very good fastness properties is obtained.

In a manner analogous to that described in Trichromatic Principle Example 3, instead of the yellow-dyeing dye of formula (302) it is possible to use the equivalent amount of a yellow-dyeing dye of formula (301), (303), (304) or (305). In that way there is likewise obtained a light-beige shade having very good fastness properties.

In a manner analogous to that described in Trichromatic Principle Example 3, instead of the brown-dyeing dye of formula (203) it is possible to use the equivalent amount of a brown-dyeing dye of formula (201), (202), (204), (205), (206) or (207). In that way there is likewise obtained a light-beige shade having very good fastness properties.

In a manner analogous to that described in Trichromatic Principle Example 3, instead of the olive-dyeing dye of formula (104) it is possible to use the equivalent amount of a dye of formula (101), (102), (103), (105), (106), (107), (108), (109), (110), (111), (112) or (113). In that way there is likewise obtained a light-beige shade having very good fastness properties.

DYEING EXAMPLE 1

Pad-Batch Method

On a padder having a squeezing effect of 70% liquor pick-up, a bleached cotton cretonne fabric is impregnated with an aqueous liquor containing, per liter, 0.92 g of the brown-dyeing dye of formula (203), 0.88 g of the olive-dyeing dye of formula (104), 2.2 g of the blue-dyeing dye of formula (401)

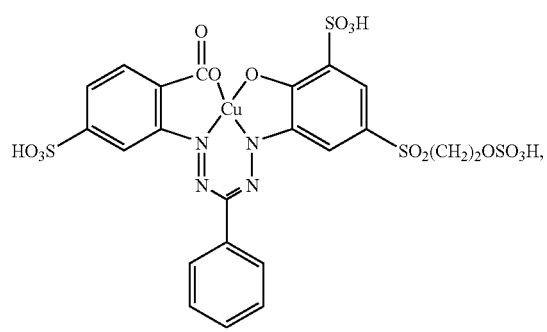

(401)

1 g of a wetting agent, 5 g of sodium hydroxide and 80 g of sodium silicate 38° Bé.

The immersion time is 2 seconds. After padding, the fabric is rolled up and then stored for 12 hours at a temperature of 25° C. After storage, the dyed cotton material is cold-rinsed and then hot-rinsed with water, subsequently soaped, hot-rinsed and warm-rinsed.

A grey shade having very good fastness properties is obtained. The dye of formula (401) is commercially available.

DYEING EXAMPLE 2

Pad-Batch Method

On a padder having a squeezing effect of 70% liquor pick-up, a bleached cotton cretonne fabric is impregnated with an aqueous liquor containing, per liter, 0.15 g of the yellow-dyeing dye of formula (302), 0.10 g of the brown-dyeing dye of formula (203), 0.10 g of the olive-dyeing dye of formula (104), 0.30 g of the red-dyeing dye of formula (501)

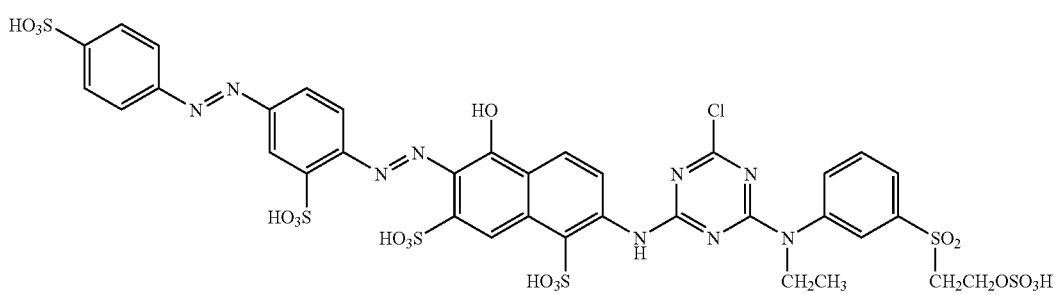

(501)

1 g of a wetting agent,
5 g of sodium hydroxide and
80 g of sodium silicate 38° Bé.

The immersion time is 2 seconds. After padding, the fabric is rolled up and then stored for 12 hours at a temperature of 25° C. After storage, the dyed cotton material is cold-rinsed and then hot-rinsed with water, subsequently soaped, hot-rinsed and warm-rinsed.

A reddish-brown shade having very good fastness properties is obtained. The dye of formula (501) is described in WO 2007/006653.

What is claimed is:
1. A dye mixture, comprising at least one dye of formula

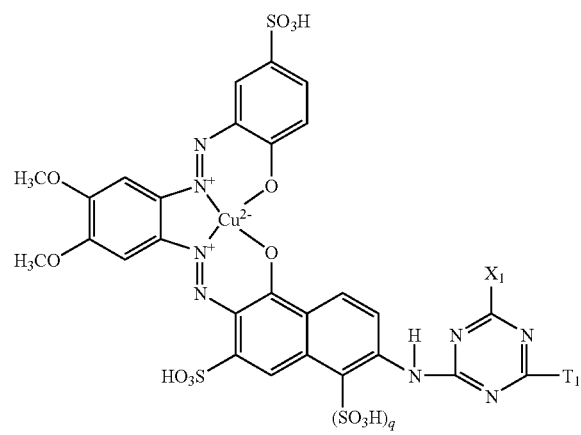

(1a)

and at least one dye from the group of formulae

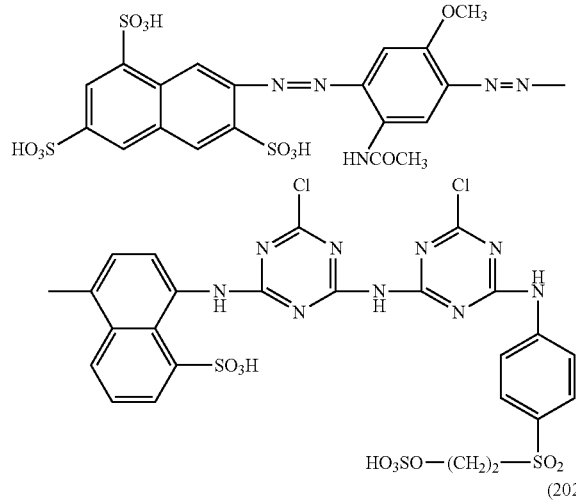

(201)

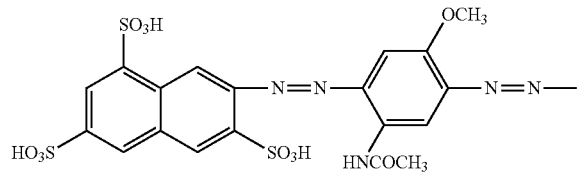

(202)

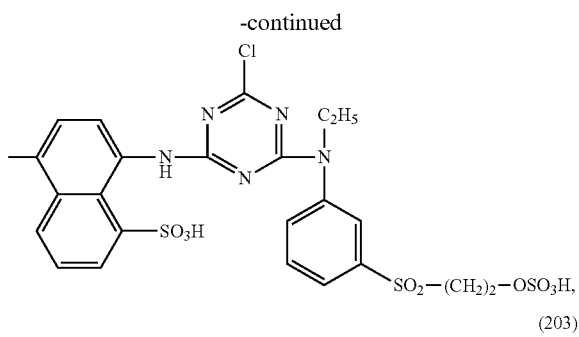

(203)

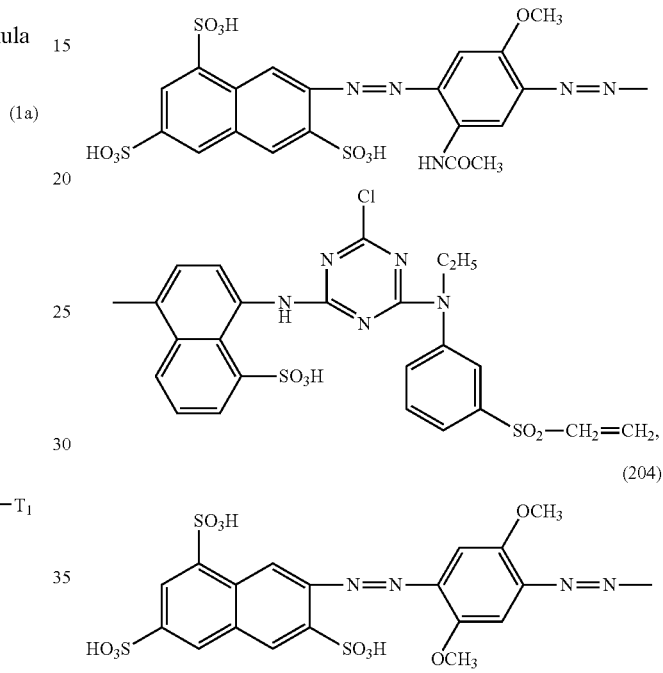

(204)

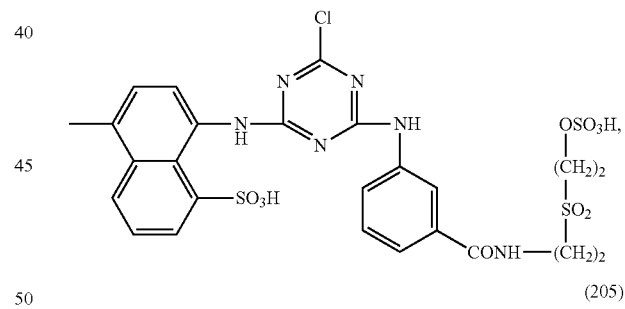

(205)

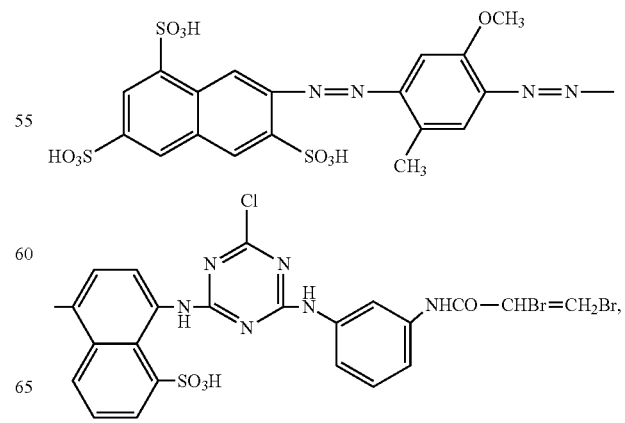

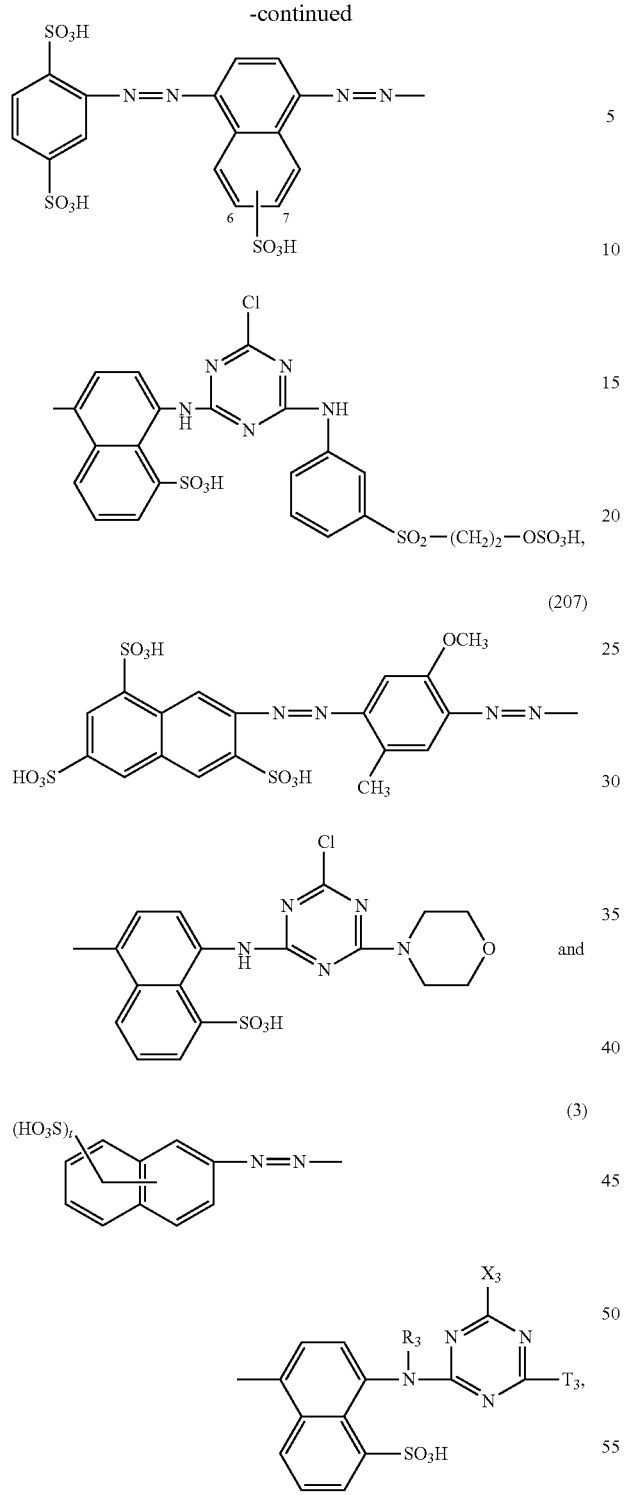

wherein
R$_3$ is hydrogen or unsubstituted or substituted C$_1$-C$_4$ alkyl,
q is 0 or 1,
t is the number 1, 2 or 3,
X$_1$, and X$_3$ are each independently of the others halogen, 3-carboxypyridin-1-yl, or 3-carbamoylpyridin-1-yl, and
T$_1$, and T$_3$ are each independently of the others a fibre-reactive radical of formula —NH—(CH$_2$)$_{2-3}$—SO$_2$—Z, (4a)

—NH—(CH$_2$)$_{2-3}$—O—(CH$_2$)$_{2-3}$—SO$_2$—Z, (4b)

(4c′)

(4c″)

(4d)

(4e)

(4f)

(4g)

wherein (R$_4$)$_{0-2}$ denotes from 0 to 2 identical or different substituents from the group halogen, C$_1$-C$_4$ alkyl, C$_1$-C$_4$ alkoxy and sulfo, Z is vinyl or a radical —CH$_2$—CH$_2$-U and U is a group removable under alkaline conditions, Q is a group —CH(Hal)-CH$_2$-Hal or —C(Hal)=CH$_2$, and Hal is halogen.

2. A dye mixture according to claim 1 wherein R$_3$ is hydrogen.

3. A dye mixture according to claim 1 wherein X$_1$, and X$_3$ are each independently of the other fluorine or chlorine.

4. A dye mixture according to claim 1, wherein the dye of formula (3) corresponds to a dye of formula

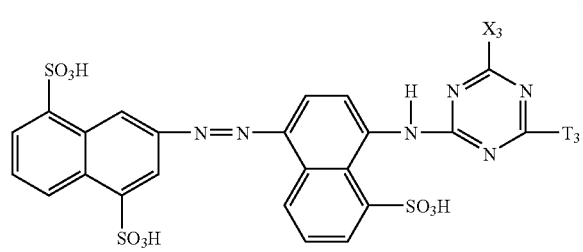
(3a)
wherein
$X_3$ and $T_3$ are each as defined in claim 1.
5. A method for the dichromatic or trichromatic dyeing or printing of hydroxy-group-containing or nitrogen-containing fibre materials, which method comprises using at least one dye of formula
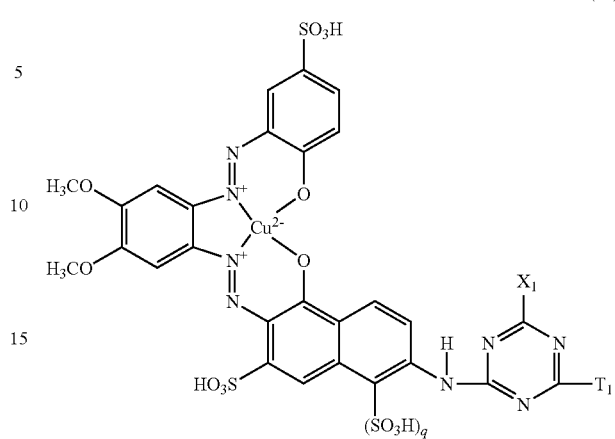
(1a)
together with at least one dye from the group of formulae
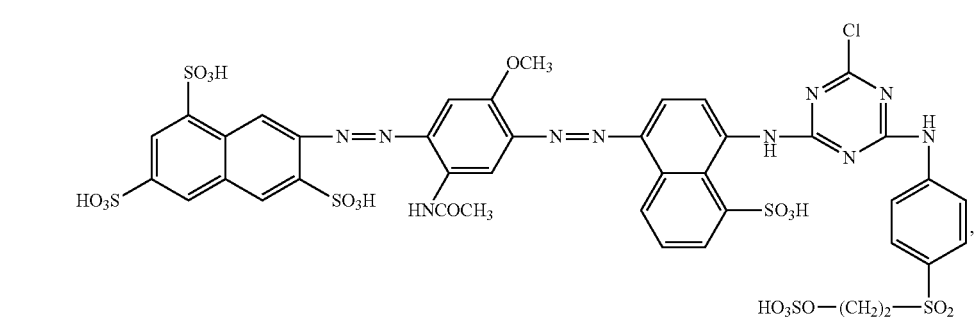
(201)
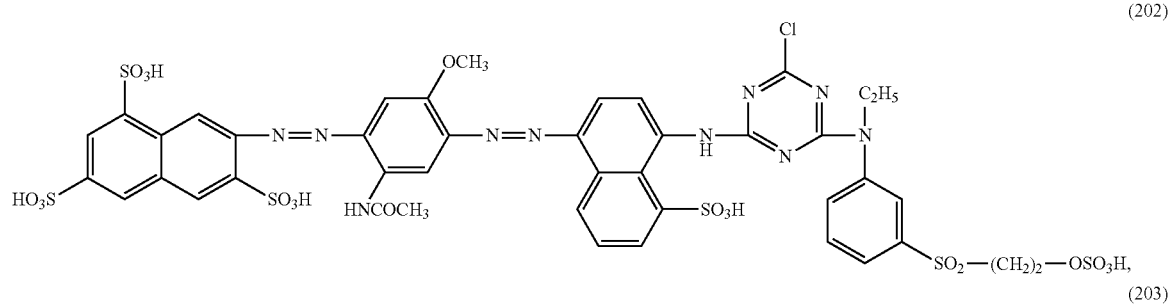
(202)
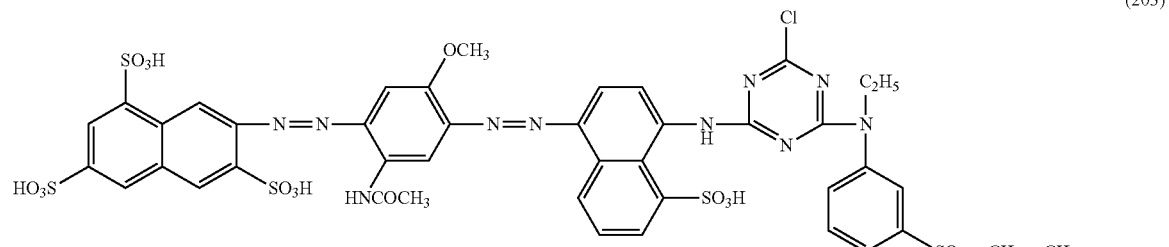
(203)
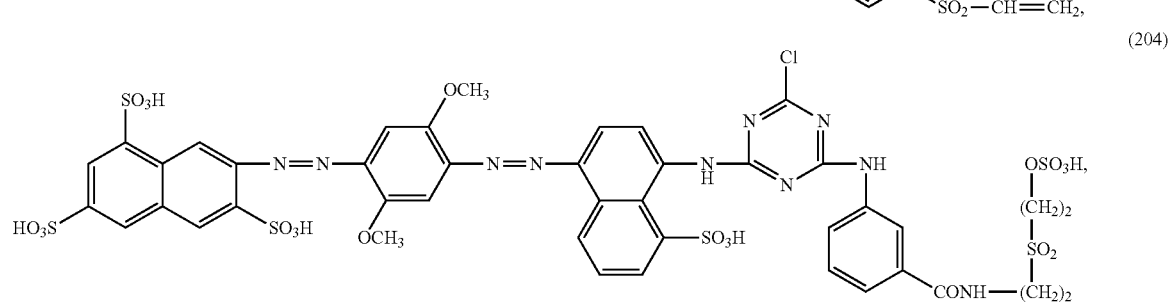
(204)

-continued

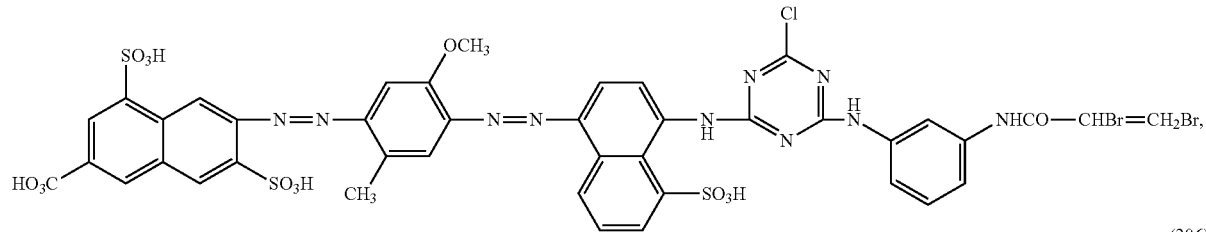
(205)

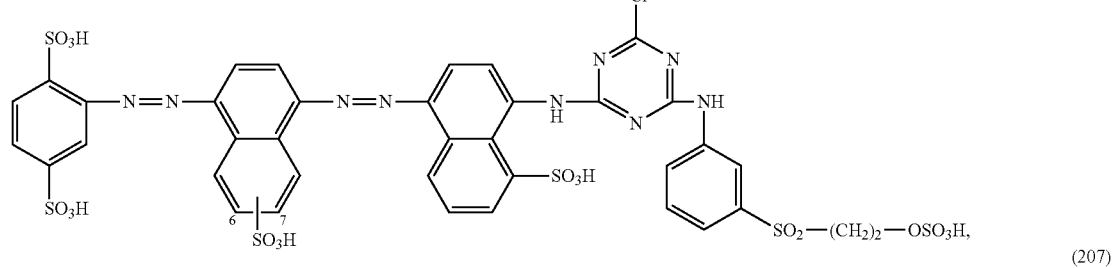
(206)

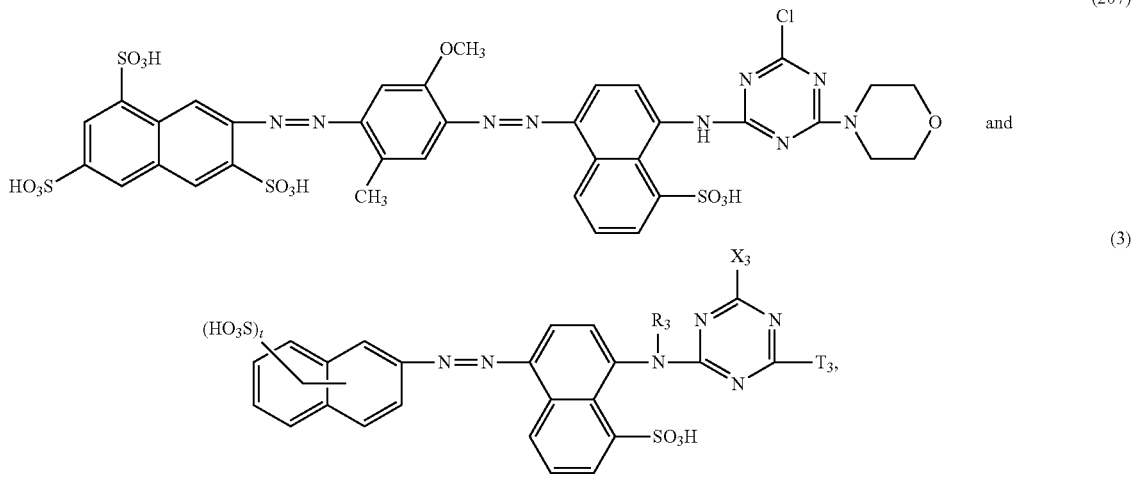
(207)

wherein R₃, X₁, X₃, T₁, T₃, q and t are each as defined in claim 1.

6. A method according to claim 5, wherein cellulosic fibre material is dyed or printed.

7. A dichromatic or trichromatic dye mixture comprising a reactive dye of formula

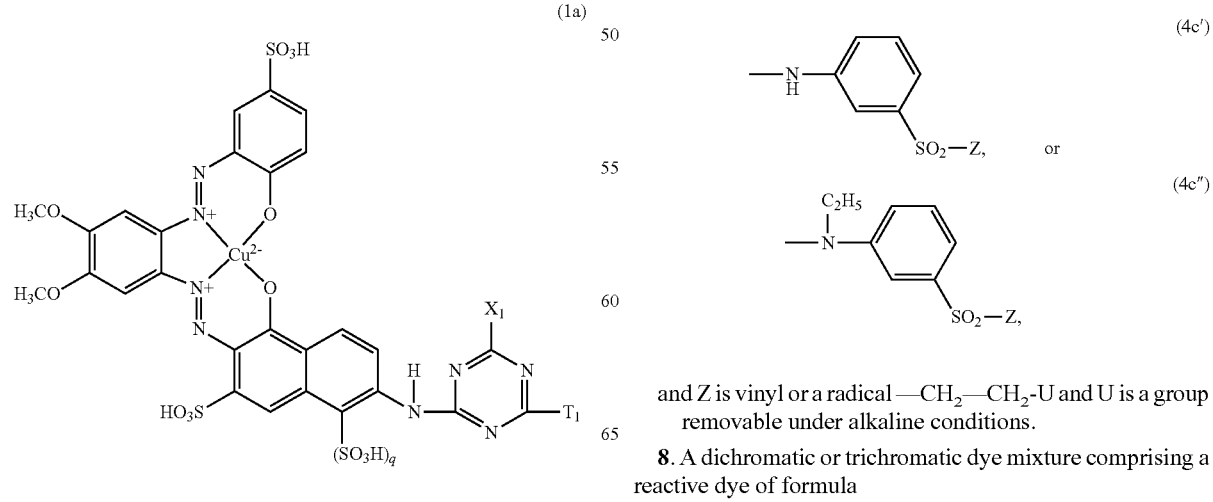
(1a)

wherein
$X_1$ is halogen,
$q$ is 0 or 1,
$T_1$ is (4c′)

—N(H)—⟨phenyl⟩—SO₂—Z, or (4c″)

—N(C₂H₅)—⟨phenyl⟩—SO₂—Z, and Z is vinyl or a radical —CH₂—CH₂-U and U is a group removable under alkaline conditions.

8. A dichromatic or trichromatic dye mixture comprising a reactive dye of formula (3)

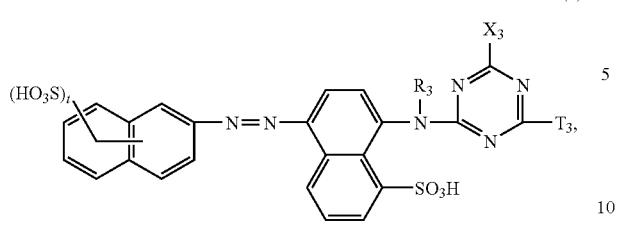

wherein
$R_3$ is hydrogen or unsubstituted or substituted $C_1$-$C_4$ alkyl,
t is the number 1, 2 or 3,
$X_3$ is halogen, and
$T_3$ is a fibre-reactive radical of formula —NH—$(CH_2)_{2-3}$—$SO_2$—Z, (4a)

—NH—$(CH_2)_{2-3}$—O—$(CH_2)_{2-3}$—$SO_2$—Z, (4b)

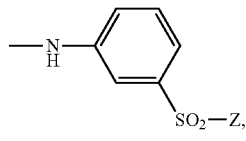 (4c')

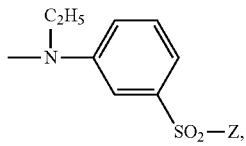 (4c'')

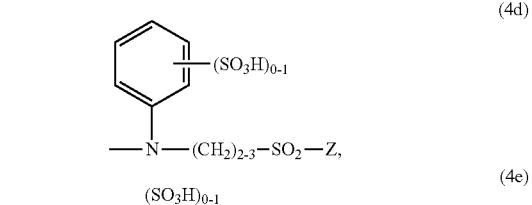

(4d)

(4e)

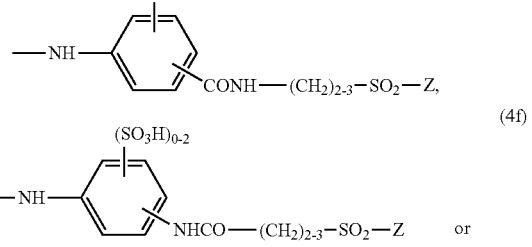

(4f)

or (4g)

wherein
$(R_4)_{0-2}$ denotes from 0 to 2 identical or different substituents from the group halogen, $C_1$-$C_4$ alkyl, $C_1$-$C_4$ alkoxy and sulfo,
Z is vinyl or a radical —$CH_2$—$CH_2$-U and U is a group removable under alkaline conditions,
Q is a group —CH(Hal)-$CH_2$-Hal or —C(Hal)=$CH_2$, and
Hal is halogen.

* * * * *